(12) United States Patent
Dove et al.

(10) Patent No.: US 6,798,784 B2
(45) Date of Patent: Sep. 28, 2004

(54) CONCURRENT SWITCHING OF SYNCHRONOUS AND ASYNCHRONOUS TRAFFIC

(75) Inventors: Jason Dove, Novato, CA (US); Brian Semple, Novato, CA (US); Mike Nelson, Rohnert Park, CA (US); Ying Zhang, San Rafael, CA (US); James W. Jones, Penngrove, CA (US); Andre Tanguay, Santa Rosa, CA (US)

(73) Assignee: Caux Networks, Inc., Petaluma, CA (US)

(*) Notice: Subject to any disclaimer, the term of this patent is extended or adjusted under 35 U.S.C. 154(b) by 0 days.

(21) Appl. No.: 09/874,352

(22) Filed: Jun. 4, 2001

(65) Prior Publication Data

US 2003/0007502 A1 Jan. 9, 2003

(51) Int. Cl.[7] .................................................. H04J 3/06
(52) U.S. Cl. ........................ 370/463; 370/458; 370/354
(58) Field of Search ................................. 370/294, 438, 370/458, 460, 463, 535, 353–355, 469, 527, 537, 420, 421, 476; 379/93.01, 93.05, 93.07, 93.09, 93.14, 142.13–142.17, 166, 187, 199, 225, 313, 325, 442

(56) References Cited

U.S. PATENT DOCUMENTS 3,652,798 A    3/1972   McNeilly et al. ....... 179/15 AL (List continued on next page.)

OTHER PUBLICATIONS

US application No. 09/874,904 entitled "Traffic Merging System", by Jason Dove et al.
US application No. 09/874,348 entitled "Switching of Multiple Classes of Synchronous Data Traffic" by Ying Zhang.
US application No. 09/874,395 entitled "Asynchronous Receive and Transmit Packet Crosspoint", by James W. Jones.
US application No. 09/874,402 entitled, "Backplane Bus", by Jason Dove et al.
US application No. 09/872,851 entitled "Optical Network Restoration", by Madan Manoharan et al.

Primary Examiner—Huy D. Vu
Assistant Examiner—Justin Philpott
(74) Attorney, Agent, or Firm—Silicon Valley Patent Group LLP

(57) ABSTRACT

A network element can be configured for connection to any portion of a communication network: access, transport and core. Moreover, a single network element can be configured to couple subscriber equipment directly to the core portion of the network, thereby permitting the subscriber to bypass the transport portion of the network. Specifically, such a network element can be configured to include a line unit that supports subscriber equipment (also called a "subscriber line unit"), and also to include a line unit to support a link to the core of the communication network (also called a "core line unit"). The subscriber line unit and core line unit are both installed in a single chassis, and each unit can be installed in any of a number of slots in the chassis. Moreover, when configured with appropriate line units, such a network element may support traditional circuit-switched telephony services while simultaneously delivering packet-based voice or data services. The network element provides multi-class service over the entire range of the network because it employs a common switch fabric for handling both synchronous and asynchronous traffic over a common bus.

7 Claims, 21 Drawing Sheets

U.S. PATENT DOCUMENTS

| | | | |
|---|---|---|---|
| 5,150,356 A | 9/1992 | Tsutsui | 370/16.1 |
| 5,365,521 A * | 11/1994 | Ohnishi et al. | 370/352 |
| 5,392,280 A * | 2/1995 | Zheng | 370/353 |
| 5,455,827 A | 10/1995 | Krause et al. | |
| 5,625,629 A | 4/1997 | Wenk | |
| 5,781,320 A * | 7/1998 | Byers | 370/395.51 |
| 5,809,021 A * | 9/1998 | Diaz et al. | 370/364 |
| 5,894,477 A * | 4/1999 | Brueckheimer et al. | 370/420 |
| 5,987,026 A * | 11/1999 | Holland | 370/353 |
| 6,014,431 A * | 1/2000 | McHale et al. | 379/93.07 |
| 6,128,300 A * | 10/2000 | Horton | 370/463 |
| 6,167,041 A * | 12/2000 | Afanador | 370/353 |
| 6,169,749 B1 | 1/2001 | Dove et al. | |
| 6,181,694 B1 * | 1/2001 | Pickett | 370/458 |
| 6,192,399 B1 * | 2/2001 | Goodman | 379/93.09 |
| 6,195,355 B1 | 2/2001 | Demizu | |
| 6,219,354 B1 * | 4/2001 | Fink et al. | 370/463 |
| 6,240,084 B1 * | 5/2001 | Oran et al. | 370/463 |
| 6,314,102 B1 * | 11/2001 | Czerwiec et al. | 379/93.01 |
| 6,359,859 B1 | 3/2002 | Brolin et al. | |
| 6,362,908 B1 * | 3/2002 | Kimbrough et al. | 359/163 |
| 6,501,758 B1 * | 12/2002 | Chen et al. | 370/395.1 |

* cited by examiner

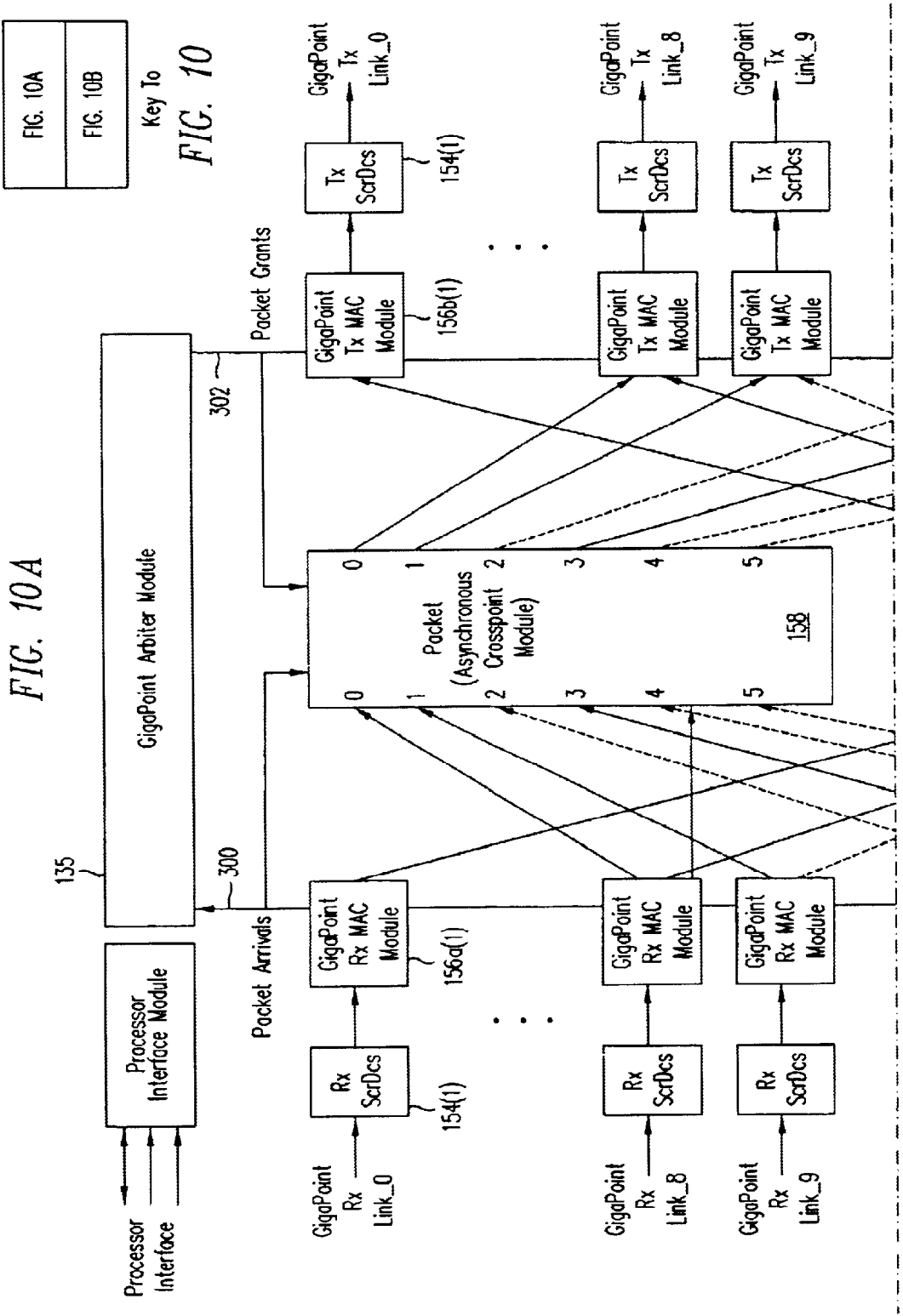

| Bit> | 31 30 29 28 | 27 26 25 24 | 23 22 21 20 19 18 | 17 | 16 15 | 14 | 13 | 12 | 11 10 9 8 7 6 5 4 3 2 1 0 |
|---|---|---|---|---|---|---|---|---|---|
| Word 0 | Packet Type [3:0] | Packet COS [3:0] | Packet Length [5:0] | AM | Cont. Ext. [1:0] | A L O O P | BP | GBP | Up: Packet Arrival / Down: Packet Grant [11:0] |
| Word 1 | Facility ID Ext. [1:0] | Facility ID [3:0] | Plane ID [1:0] | Routing Map [23:0] | | | | | |
| Word 2 | Flow ID Extension [19:16] | | Flow ID [15:0] | | | | | | |
| Word 3 | | VCI [15:0] | | | PTI [2:0] | CLP | rfu [3:0] | VPI [11:0] | HEC (of 120 bits) [7:0] |

*FIG. 17*

CONCURRENT SWITCHING OF SYNCHRONOUS AND ASYNCHRONOUS TRAFFIC

CROSS REFERENCE TO RELATED APPLICATIONS

This application is related to and incorporates by reference herein in their entirety the following commonly owned and concurrently filed U.S. patent applications:

U.S. application Ser. No. 09/872,851 entitled "Optical Network Restoration" by Madan Manoharan et al;

U.S. application Ser. No. 09/874,402 entitled "Backplane Bus" by Jason Dove and Brian Semple;

U.S. application Ser. No. 08/874,904 entitled "Traffic Merging System" by Jason Dove, Brian Semple, Andre Tanguay, and James Lotz;

U.S. application Ser. No. 09/874,348 entitled "Switching of Multiple Classes of Synchronous Data Traffic" by Ying Zhang; and U.S. application Ser. No. 09/874,395 entitled "Asynchronous Receive And Transmit Packet Crosspoint" by James Jones.

CROSS REFERENCE TO ATTACHMENTS A–I

The following attachments which describe an illustrative embodiment of the present invention are a part of the present disclosure and are incorporated by reference herein in their entirety.

Attachment A entitled "Hardware Architectural Specification;"

Attachment B entitled "GRX ASIC Functional Specification;"

Attachment C entitled "GRX ASIC Packet Crosspoint Module Specification;"

Attachment D entitled "GRX ASIC Synchronous Crosspoint Module Specification;"

Attachment E entitled "GigaPoint Media Access Controller (GP MAC) Module Specification;"

Attachment F entitled "GigaPoint Bus Hardware Architectural Specification;"

Attachment G entitled "GigaPoint Access Processor (GAP) ASIC Functional Specification;"

Attachment H entitled "GAP ASIC GigaPoint Adaptation (GA) Module Specification;"

Attachment I entitled "GAP Virtual Output Queue Controller (VOQC)ASIC Module SpecificationGAP ASIC GigaPoint Adaptation (GA) Module Specification."

Attachments A–I contain detailed specifications for various portions of the network element.

A portion of the disclosure of this patent document contains material that is subject to copyright protection. The copyright owner has no objection to the facsimile reproduction by anyone of the patent document or the patent disclosure, as it appear in the U.S. Patent and Trademark Office patent files or records, but otherwise reserves all copyright rights whatsoever.

BACKGROUND

Traditionally, central office switches that process telephone calls between subscribers typically use switches called Class 5 switches, such as the 5ESS available from Lucent. A telephone instrument may be directly connected to such a Class 5 switch as illustrated in FIG. 1 if the telephone instrument is located within 18 kilofoot radius. Beyond the 18 kilofoot radius, support for such telephone instruments that use a copper twisted pair may be provided through a digital loop carrier (DLC) which has two portions; a central office terminal and a remote terminal. The central office terminal is normally located within the central office and communicates with the remote terminal using a digital signal over metallic (such as copper) or optical link (also called "digital line"). The central office terminal of the digital loop carrier is coupled to the Class 5 switch in the central office and the coupling may conform to an aggregation interface, sicj as GR303 (a standard defined by Telcordia). The remote terminal in turn is connected to a number of telephone instruments. Depending on the hardware installed within the remote terminal, such a remote terminal may also provide a high-speed trunk, such as T1 that may be needed by a business and/or be coupled via modems to personal computers to support data traffic.

The DLC remote terminal may be implemented by a digital multiplexer that combines a number of subscriber channels into a single high speed digital signal, and the DLC central office terminal implemented by a de-multiplexer. Because a digital line cannot carry signals as far as a corresponding analog line, the digital line often requires a number of digital repeaters to boost signal level. A typical digital line of a DLC carries from 24 to 3000 POTS circuits. Note that a DLC central office terminal may be eliminated, e.g. as in case of an Integrated Digital Loop Carrier System, wherein the digital line is directly connected to the Class 5 switch.

All of the above-described equipment up to the Class 5 switch in the central office is traditionally referred to as forming the "access" portion of a public switched telephone network (PSTN). The Class 5 switch may be associated with a portion of a telephone number, e.g. the portion 252 in a telephone number 408-252-1735. All telephones that are serviced by a single Class 5 switch are normally assigned a telephone number that includes a preset prefix, e.g. 252. The Class 5 switch typically forms connections between telephones within its own service area, each of which starts with the preset prefix, e.g. 252. When a telephone instrument within its service area places a call to a number different from the numbers starting with the preset prefix, the Class 5 switch connects the telephone instrument to another switch which may be of a different class, such as a Class IV switch, commonly referred to as a hub switch.

The hub switch is typically coupled to a number of Class 5 switches through a ring of add/drop multiplexer (ADMs). For example, each central office may have a Class 5 switch co-located with and coupled to an add/drop multiplexer, and in addition the hub switch is also co-located with and coupled to an add/drop multiplexer. All of the add/drop multiplexers are connected to one another in a ring topology. Such a ring topology typically contains two optical fiber connections between each pair of add/drop multiplexers, wherein one of the connections is redundant, and used primarily in case of failure. The just-described ring of add/drop multiplexers that connects a number of central office switches to a hub switch is typically referred to as forming the "interoffice" or "transport" portion of the public telephone network. The hub switch is typically connected to a number of other hub switches by another portion of the network commonly referred to as "core".

To support data traffic, for example, to provide Internet access to a business, central offices typically contain additional equipment called a DSLAM which provides a digital subscriber line (DSL) connection to the business. The DSLAM may only service businesses that are within 18 kilofeet, e.g. because of the limitations of a copper twisted pair connection. Such DSLAMs are typically connected inside the central office to an add/drop multiplexer so that data traffic can be routed to an Internet Service Provider (ISP). For businesses located outside of 18 kilofeet radius of a central office, a remote terminal of a digital loop carrier can be used to provide an IDSL service, which is based on the use of a ISDN link to the central office, via the central office terminal of the DLC.

The development of DSLAM, IDC and IDSL applications was the result of the need for access to the Class 5 switch by remote businesses and subscribers, particularly due to development remote from the Class 5 switches. Recently, larger businesses have bypassed this copper remote access to the transport layer of networks using larger fiber optic trunks with large bandwidth capabilities. This new access has been called Metro Access. Smaller businesses would also benefit from this access, but so far most applications are too expensive to provide this direct access to small enterprise and subscribers. Thus, it would be highly desirable for a network access solution that provides the bandwidth of fiber access in the place of the typical copper remote access functions, especially that is cost-competitive with the legacy technology. It would also be highly desirable if that some solution could be used to perform cost-effectively at the remote access level, but through simple substitution of line card units to accommodate different types of traffic, could be deployed to interface with the core itself.

SUMMARY

In accordance with the invention, a network element can be configured for connection to any portion of a communication network: access, transport and core. Moreover, a single network element can be configured to couple subscriber equipment directly to the core portion of the network, thereby to bypass the transport portion of the network. Specifically, such a network element can be configured to include a line unit that supports subscriber equipment (also called "subscriber line unit"), and also to include a line unit to support a link to core of the communication network (also called "core line unit"). The subscriber line unit and core line unit is both installed in a single chassis, and each unit can be installed in any of a number of slots of the chassis. Moreover, when configured with appropriate line units, such a network element may support traditional circuit-switched telephony services, such as DSLAM, DLC and ADM while simultaneously delivering packet-based voice or data services.

BRIEF DESCRIPTION OF THE DRAWINGS

FIG. 17 illustrates the GigaPoint header which is in 32-bit format in one embodiment.

DETAILED DESCRIPTION

Figure 1:
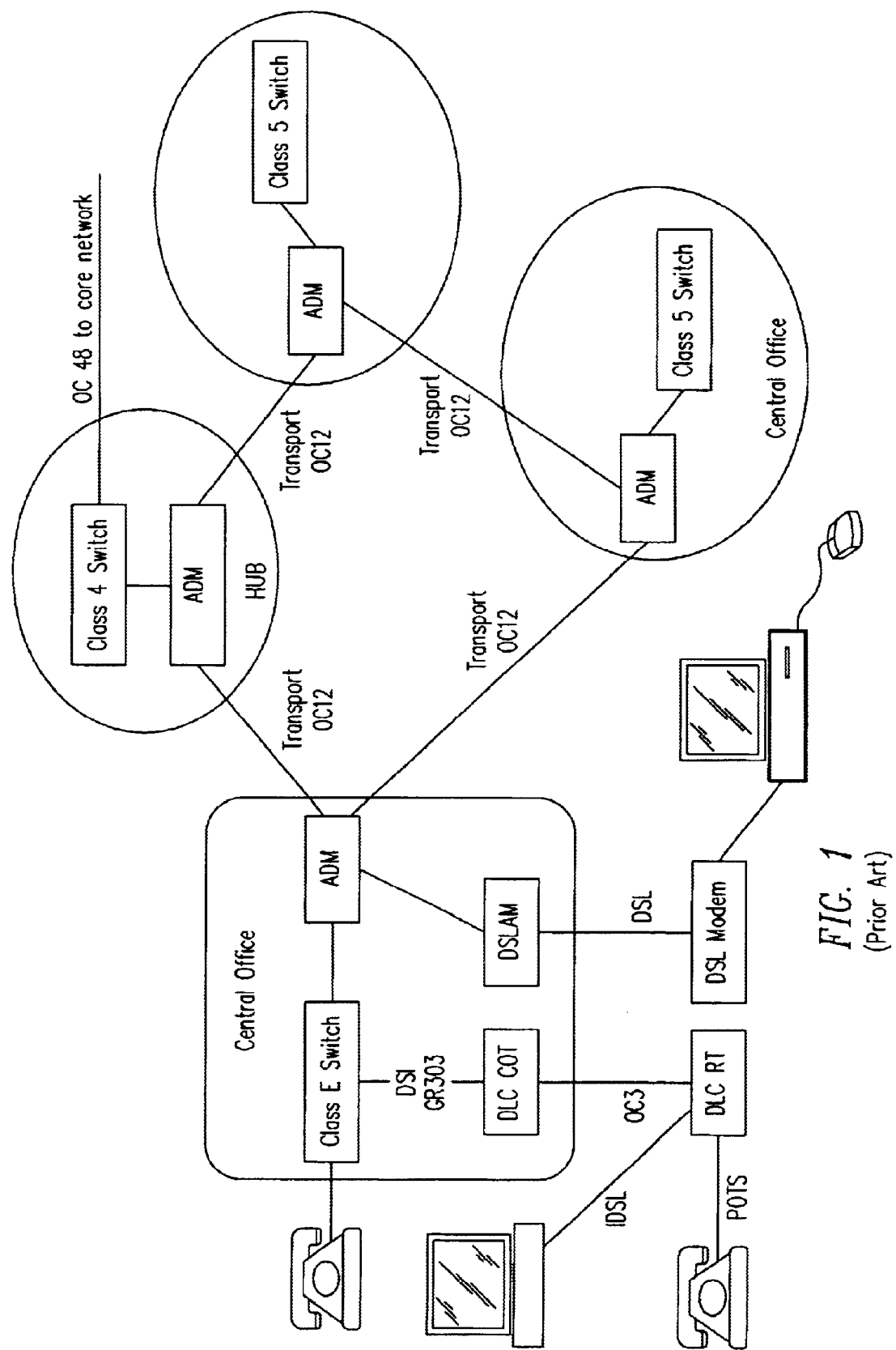
FIG. 1 illustrates prior art connection of a telephone instrument to a Class 5 switch.
Figure 2:
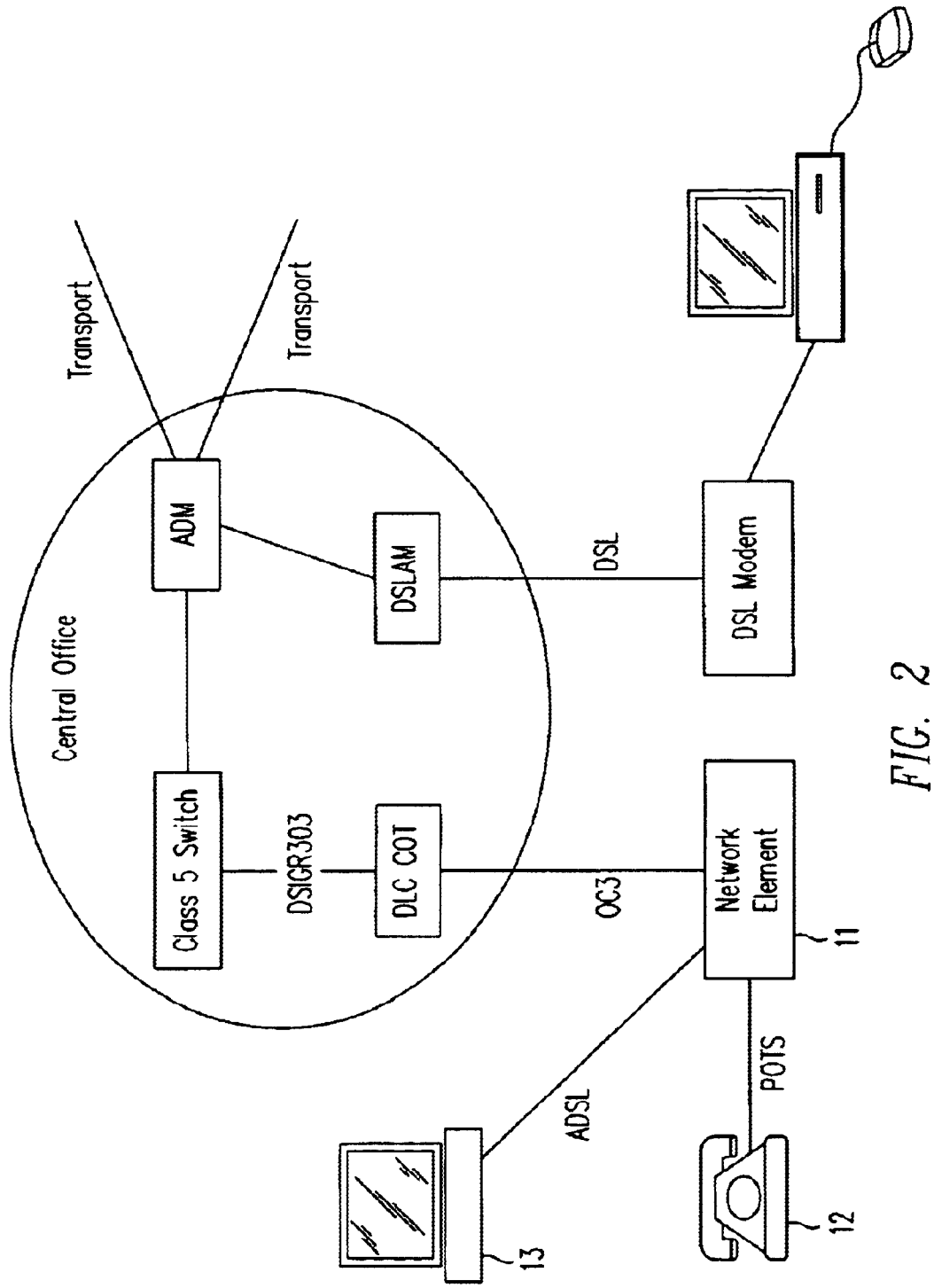
FIG. 2 illustrates a network element in accordance with the invention that may be directly coupled to any kind of subscriber equipment.
Figure 3:
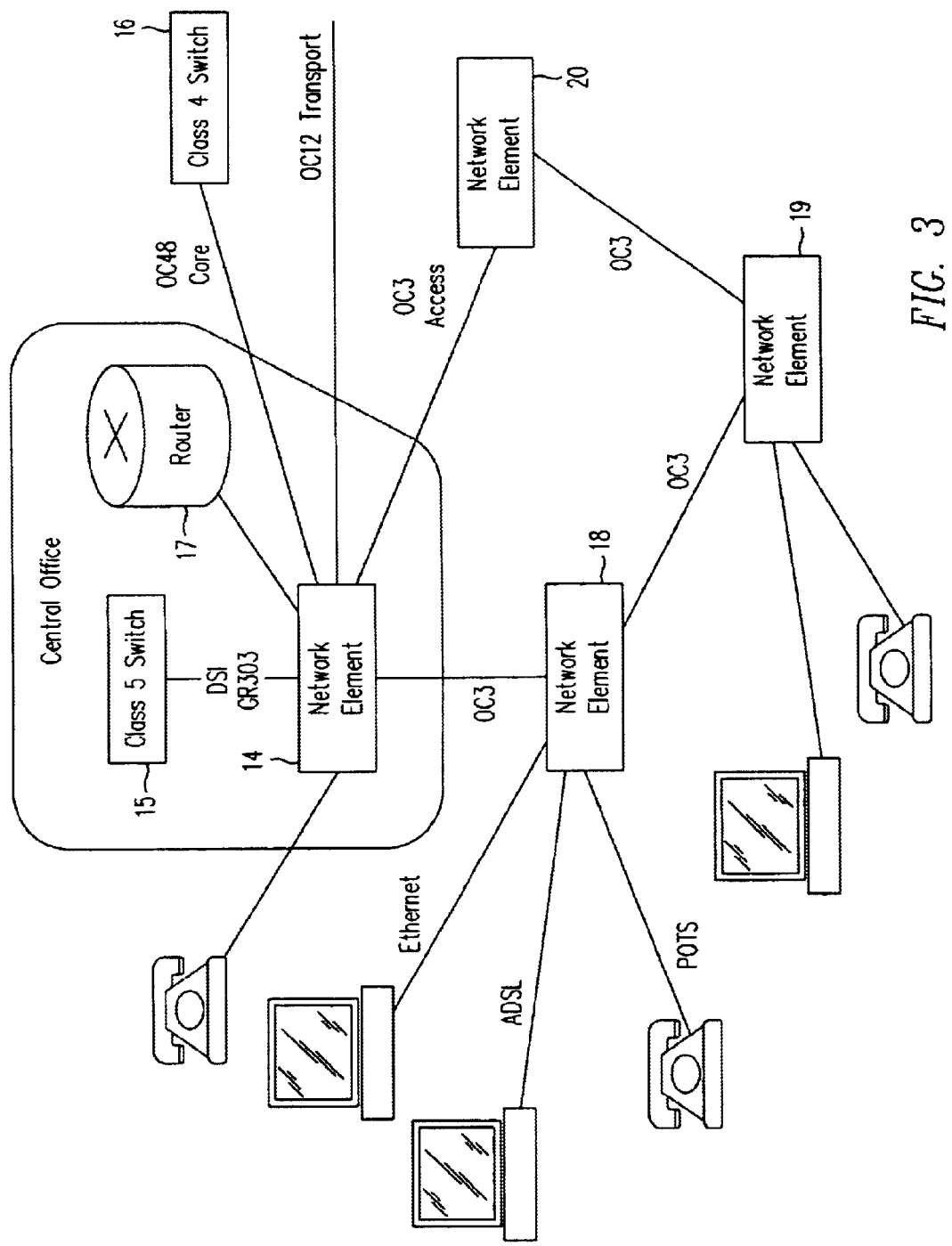
FIG. 3 illustrates a network element in accordance with the invention that may be coupled directly to a router and further coupled to other network elements in a ring topology.
Figure 4:
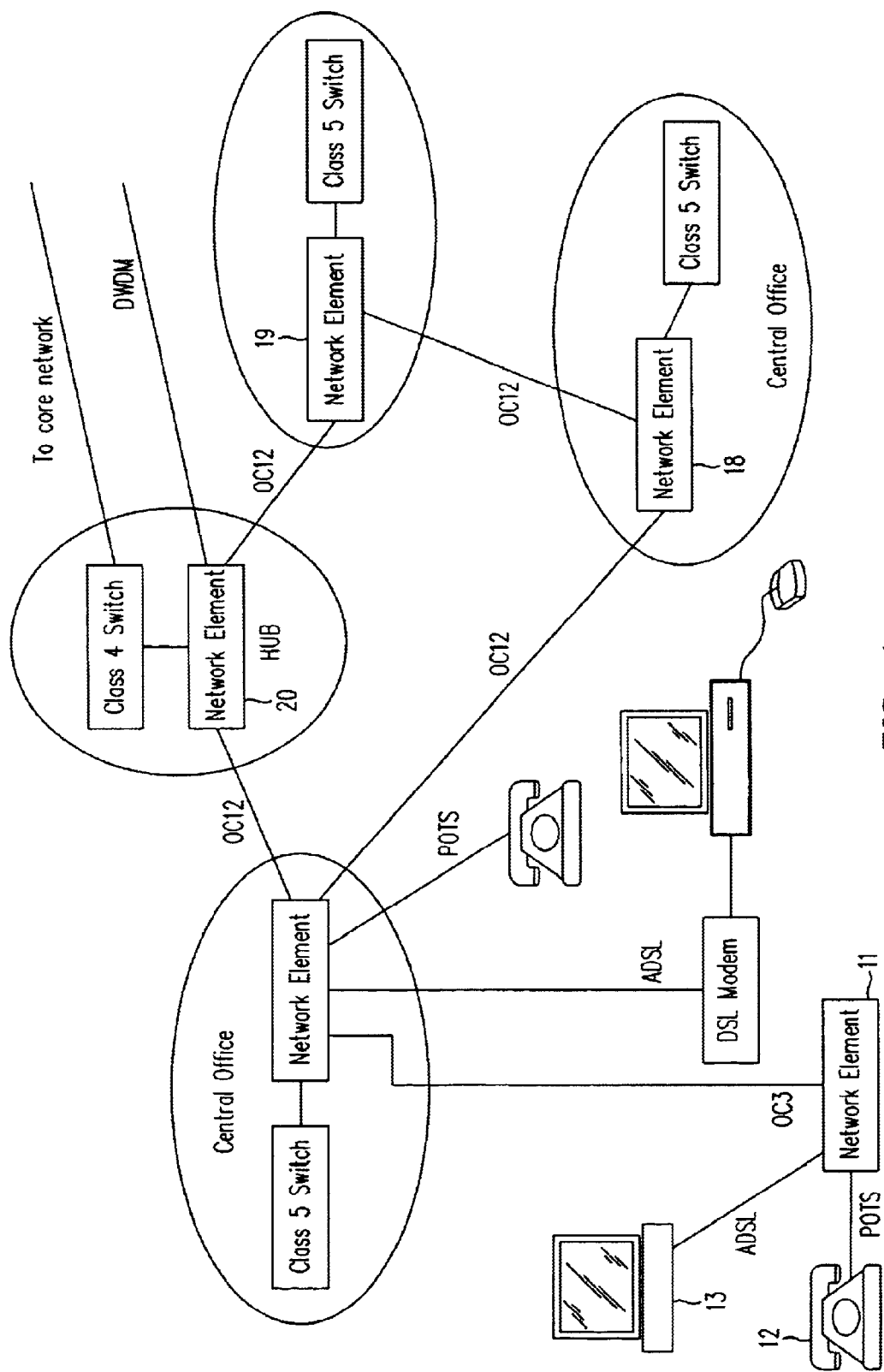
FIG. 4 illustrates another configuration using the network elements of FIGS. 2 and 3.

A network element 11 (FIG. 2) in accordance with the invention may be directly coupled to any kind of subscriber equipment (such as a telephone instrument 12, or a modem in a personal computer 13), when equipped with appropriate line units that support the subscriber equipment. Moreover, such a network element 14 (FIG. 3) may also be coupled (either through a central office terminal of a DLC, or through another network element, or even directly) to a switch of any class (such as a central office switch 15 or a hub switch 16), when equipped with an appropriate line unit. In addition, network element 14 may also be coupled directly to a router 17 (FIG. 3), again when equipped with an appropriate line unit. The network element 14 may be further coupled to other network elements 18, 19 and 20 in a ring topology to provide protection for voice traffic, e.g. support UPSR or BLSR ring functions defined by the SONET standard. Network element 14 may also be configured to protect data traffic as described in U.S. patent application Ser. No. 09/872,851 entitled "Optical Network Restoration" by Madan Manoharan et al.

Figure 5:
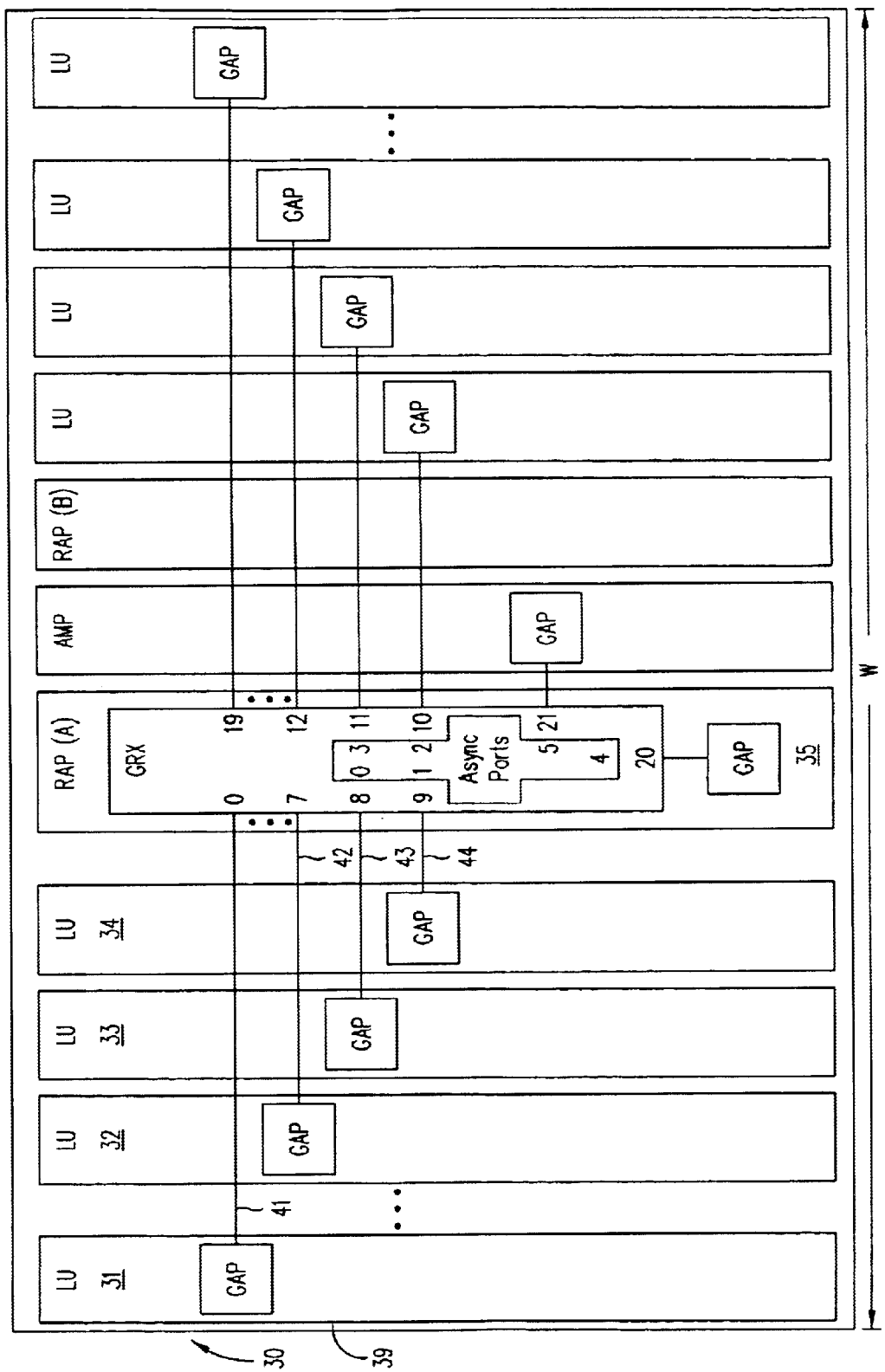
FIG. 5 illustrates an internal configuration of a network element in accordance with the invention.

Also, network elements of the type described herein, when equipped with the appropriate line units, can be used in the transport portion of the public telephone network and also in the core portion. For example, the network element as described herein may be coupled by an interexchange carrier to network trunk facilities to provide interoffice call delivery. When used in the core portion, such a network element may be provided with line units that are coupled to a long distance network, and may support dense wave division multiplexing (DWDM). Therefore, depending on the requirement, a single network element 30 (FIG. 5) of the type described herein may be equipped with a line unit 31 (which may also be called "subscriber line unit") containing circuitry to support subscriber equipment, such as plain old telephone service (POTS) on copper twisted pair, and another line unit 32 (which may also be called "core line unit") containing circuitry to support the core portion of a communication network, e.g. at OC-48 or OC-192 rates.

The same network element 30 may also contain another line unit 33 (which may also be called "central office line unit") containing circuitry to support an aggregation interface (such as GR303 or TR008) to a central office switch (such as the 5ESS available from Lucent), e.g. at DS1 rate. The same network element 30 may also contain yet another line unit 34 (which may also be called "router line unit") containing circuitry to support a data interface (such as 1 Gigabit Ethernet or 10 Gigabit Ethernet).

Although just four different kinds of line units 31–34 have been discussed above, any number of different kinds of line units may be used in a network element as described herein. For example, one implementation supports the following analog, digital, ethernet, and optical line units: POTS (24 ports), DSL (24 ports), combination of POTS and DSL, DS1 (12 ports), DS3 (8 ports), 10BaseT, 100BaseT, 1 Gigabit Ethernet, 10 Gigabit Ethernet, ESCON (Enterprise Systems Connection), FICON (Fiber Connector), OC3 (4 ports), OSC12 (2 ports), OC48 (single port), Fiber to Business (12 OC 1 ports coming in and one OC12 port going on). This implementation also supports a number of different kinds of these line units, e.g. POTS card may provide just basic telephone service, or provide universal voice grade service, or coin service, or transmission only service (2 wire or 4 wire), or private line automatic ring-down service (PLAR), foreign exchange service. Furthermore the network element may be configured with one or more cards that interface with a Class 5 switch or with a router: e.g. DS1 card with GR 303 aggregation, or PLAR, or transmission only, or OC3 (packet), or OC12 (packet), or OC48 (packet).

Each line unit 31–34 described above is coupled by one or more busses 41–44 (FIG. 5) to the switch unit 35, physically located in a high-speed area of a backplane of chassis 39. Depending on the embodiment, the one or more buses 41–44 may be of any kind, synchronous or asynchronous, and may be either parallel or serial. Such buses operated at 3.1 Gbps. Information is transmitted over such buses of the backplane in discrete units called "frames," and a number of frames are grouped into a superframe, e.g. in a manner similar to SONET. The information on such buses may be generated by circuitry (labeled GAP in FIG. 5), in each line unit (labelled LU in FIG. 5), in a format described in, U.S. patent application Ser. No. 09/874,402 entitled "BACKPLANE BUS" by Jason Dove and Brian Semple. In one example, such frames are grouped into 6 millisecond superframe. The physical layer for the backplane buses is described in IEEE 802.3z. Such buses may be coupled via a connector, e.g. a 5-row by 10 VHDM connector in each LU slot of chassis 39, and and an 8-row by 60 VHDM connector in the RAP slots.

In addition to containing line units (which can be of different kinds or all of the same kind), the above-described network element 30 also contains a cross-connect to transfer traffic among various line units. For example, traffic to and from subscriber equipment (also called "subscriber traffic"), such as a telephone instrument or a private branch exchange (PBX), that is carried by a subscriber line unit 31 is switched by such a cross-connect to core line unit 32. Therefore, core line unit 32 carries the subscriber traffic sequentially, thereby to pass the subscriber traffic to and from the core of the communication network, e.g. to support a long distance telephone call. The transfer of traffic between line units and the cross-connect changes with time, so that at a different moment in time, traffic to/from subscriber line unit 31 may be switched by such a cross-connect to/from router line unit 34, e.g. if the traffic originates from and has as its destination a modem (which modem may be coupled to a different port of line unit 32 from the port to which the above-described telephone instrument is coupled).

A network element of the type described above implements in its line units a number of functions that were performed by a number of discrete products in the prior art. Therefore, a network element of the type described herein eliminates the need for a communication service provider to deploy such discrete products. Specifically, one embodiment of the network element eliminates the need for digital loop carriers (DLCs), DSLAMs, add/drop multiplexers (of both types: access and transport). Instead, a communication service provider can simply use a single chassis of the network element, and install whichever subscriber line unit is needed to support the type of services required by its customers. If necessary, such a single chassis may also be configured to contain a core line unit to connect to the core network. Also, if necessary, the number of chassis in a single network element may be incrementally increased (e.g. up to a total of 5 chassis which fit in a single cabinet). Therefore, a network element of the type described herein can be used to provide services at the network edge, e.g. to small businesses and at the same time to connect Class 5 switches to long-distance trunk facilities, and/or interexchange transport facilities. Therefore, a network element of the type described herein may be used in any portion of the entire communication network, to provide any service.

In one embodiment, each of line units 31–34 (FIG. 5) are installed in a chassis 39 in which is also installed a unit 35 (which may also be called "switch unit") that contains the above-described cross-connect. Each of units 31–35 may be implemented in a modular manner, e.g. as cards that can be inserted into and removed from chassis 39. There may be one or more additional cards that act as standby in case of a failure of a portion of the circuitry in such cards. However, in other implementations, it is not necessary for the units to be modular, or to be implemented in cards. For example, switch unit 35 may be built into a chassis in an alternative implementation. In one specific implementation, switch unit 35 and a line unit are implemented in a single card, such as a common control card discussed in Attachment A in reference to RAP. The line unit that is installed on the RAP card may contain circuitry that supports any traffic rate, such as OC3, OC12 and OC48.

In one implementation, chassis 39 is 19 inches wide and contains 23 slots, whereas an another implementation chassis 39 is 23 inches wide, and provides 29 slots. Width W (FIG. 5) is selected so as to allow chassis 39 to be installed in a rack commonly found in a central office. Regardless of the number of slots present, in one embodiment one slot in the center is reserved for a card that contains an interface unit (to interface with humans), and two slots on either side of the center slot are resered for two copies of the above-described common control card, wherein one copy is used as a standby for the other copy. The usage of slots in one embodiment is described in the following table:

| | |
|---|---|
| SLOT 1 through SLOT 10 | Line Units (incl. transport) |
| SLOT 11 | Common Control (RAP) |
| SLOT 12 | Interface Unit (AMP) |

| | |
|---|---|
| SLOT 13 | Common Control (RAP) |
| SLOT 14 through SLOT 23 | Line Units (incl. Transport) |

Switching of the two kinds of traffic (voice and data) as described above, by the cross-connect in switch unit 34 is performed in two separate circuits, namely a synchronous cross-connect, and an asynchronous cross-connect that are respectively described in the U.S. patent application Ser. No. 09/874,348 entitled "Method and Apparatus for Efficient Switching of Multiple Classes of Synchronous Data Traffic" by Ying Zhang and U.S. patent application Ser. No. 09/874,395 entitled "Asynchronous Receive And Transmit Packet Crosspoint" by James Jones, both of which were incorporated by reference above. The synchronous cross-connect, and the asynchronous cross-connect operate simultaneously, i.e. one cross-connect switches traffic to/from one set of input-output ports while at the same time the other cross-connect switches traffic to/from another set of input-output ports. The just-described input-output ports are of the cross-connect as a whole, and their division into the two sets changes with time, as described briefly herein and in detail in Attachments A–I.

A network element of the type described above may be used to groom a broad range of traffic classes, including ATM, Frame Relay, IP, STS and TDM traffic. In one embodiment, any combination of the foregoing traffic types can be switched between a core network and/or PSTN and business users and/or residential users. A communication network of this embodiment includes two network elements that are hereinafter referred to as a Host Node (HN) that typically resides at a central office (CO) and a Flex Node (FN) that resides at a remote terminal to which individual users have access. Although in this particular embodiment (as described in detail next) the network elements are used as Host Nodes and Flex Nodes in other embodiments such network elements may be used as other components of a communication network, such as add-drop multiplexers.

In the following description and related figures, the following convention is used: a single reference sing, e.g. sign 118, may be used to identify one or more items in a group when the description applies commonly to all items, but when a specific item in the group is being discussed, that specific item is marked with an extended reference sign, e.g. sign 118(A), which includes the just-described reference sign. Therefore, in the following description, a three digit reference sign, e.g. 118, may commonly identify one or more items that are also individually identified by their extended reference signs, e.g. 118(A) and 118(B).

Host Node 110 and Flex Node 112 (see FIG. 6) of this embodiment contain many of the same components, e.g. each node has at least a first shelf 114a, 116a, respectively. Shelves 114a, 116a of have a number of slots for receiving and coupling circuit boards (118, 120 respectively) to a common back-plane (not shown) by which the circuit boards of each shelf communicate with one another. Shelf 114a of host node 110 has two slots for receiving an active and a redundant Routing and Arbitration Processor board (RAP (A) 124a and RAP(B) 124b respectively). Shelf 116a of flex node 112 has two slots for receiving an active and redundant Routing and Arbitration Processor board (RAP(A) 122a and RAP(B) 122b respectively). The RAP (for both nodes 110, 112) performs the primary functions providing an interface for up to 32 full-duplex data ports over which data traffic is received or transmitted, routing the data traffic between the ports, and to condition the data traffic for routing. Typically, only one of the RAP boards is active, while the other remains idle unless pressed into action as a result of a failure of the first RAP board. Each shelf 114a and 116a of nodes 110 and 112 also has one slot for an administration and maintenance processor board (AMP) 115. The AMP provides test access, alarm status, application hosting, and the AMP 115 provides an Ethernet connection, for Network Element Management.

Shelves 114a and 116a of nodes 110, 112 also have at least twenty slots to receive circuit boards that form line units 118, 120 respectively. As noted above, such line units may be implemented as circuit boards that are specifically designed to transmit and receive particular forms of traffic. For example, some line units have ports and circuitry to interface with POTS terminals. The same line units may have other ports designed to interface with DS-1, DS-3, DSL, STS or optical standards such as OC-3, OC-12 and OC-48 for example. Moreover, all ports of certain line units may be of the same kind, e.g. a single line unit may have only POTS ports.

All of the line items 118, 120 of a given shelf 114a, 116a provide communication between some number of ports to the outside world, and one or more backplane buses of the type described above. In one implementation, the backplane buses are full duplex serial buses (in one specific example illustrated in the Attachments A–Z such buses are called GigaPoint buses) coupled to the active RAP(A) and inactive RAP(B) of the shelf through the backplane (not shown). In one embodiment, each slot of a given shelf has four such serial buses by which each line unit plugged therein is coupled to the RAP(A) of that shelf and four such serial buses by which the line unit plugged therein is coupled to the RAP(B) of that shelf.

Figure 6A:
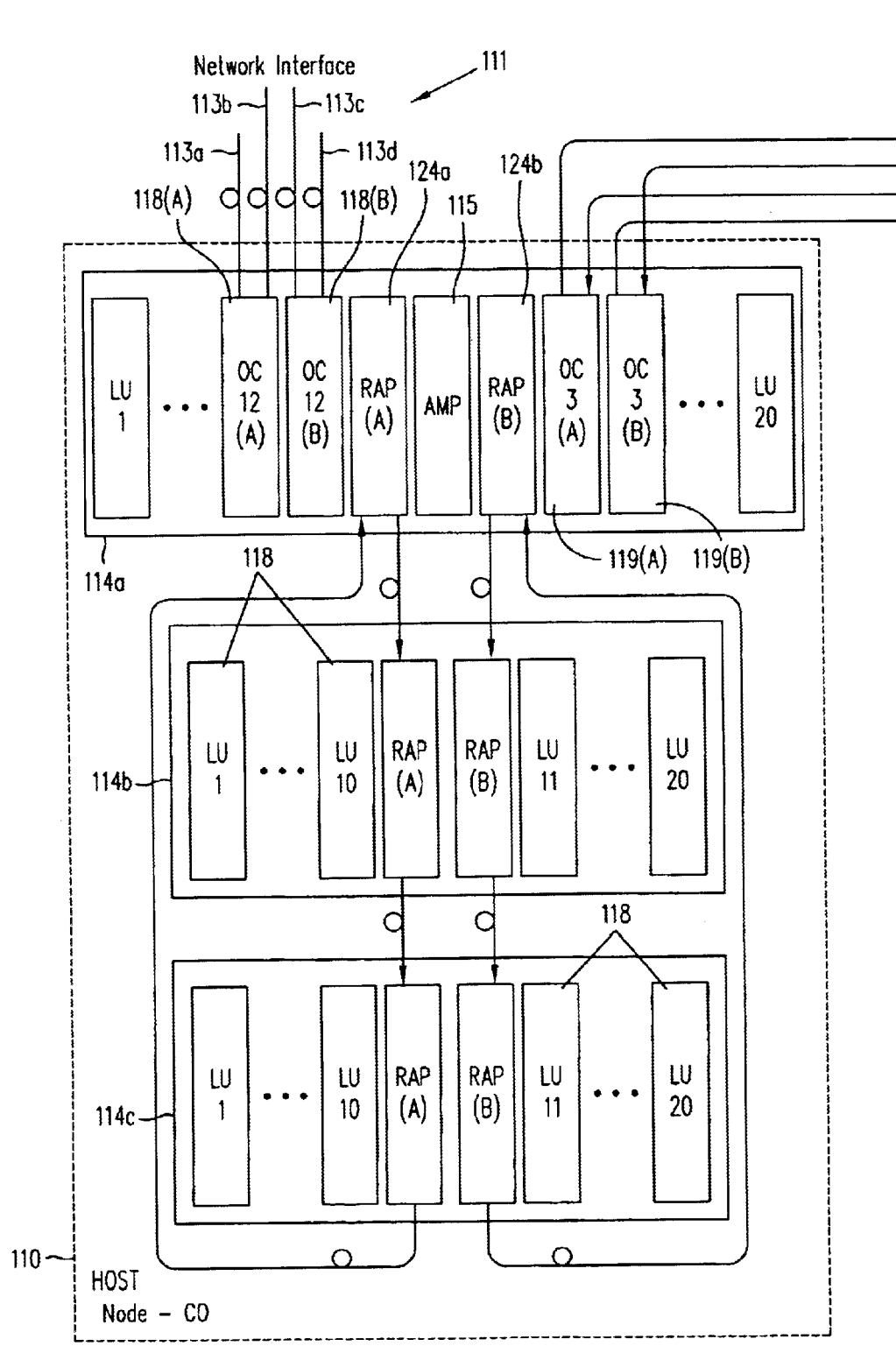
FIG. 6 illustrates use of two network elements in accordance with the invention at a central office and a remote terminal.
Figure 6B:
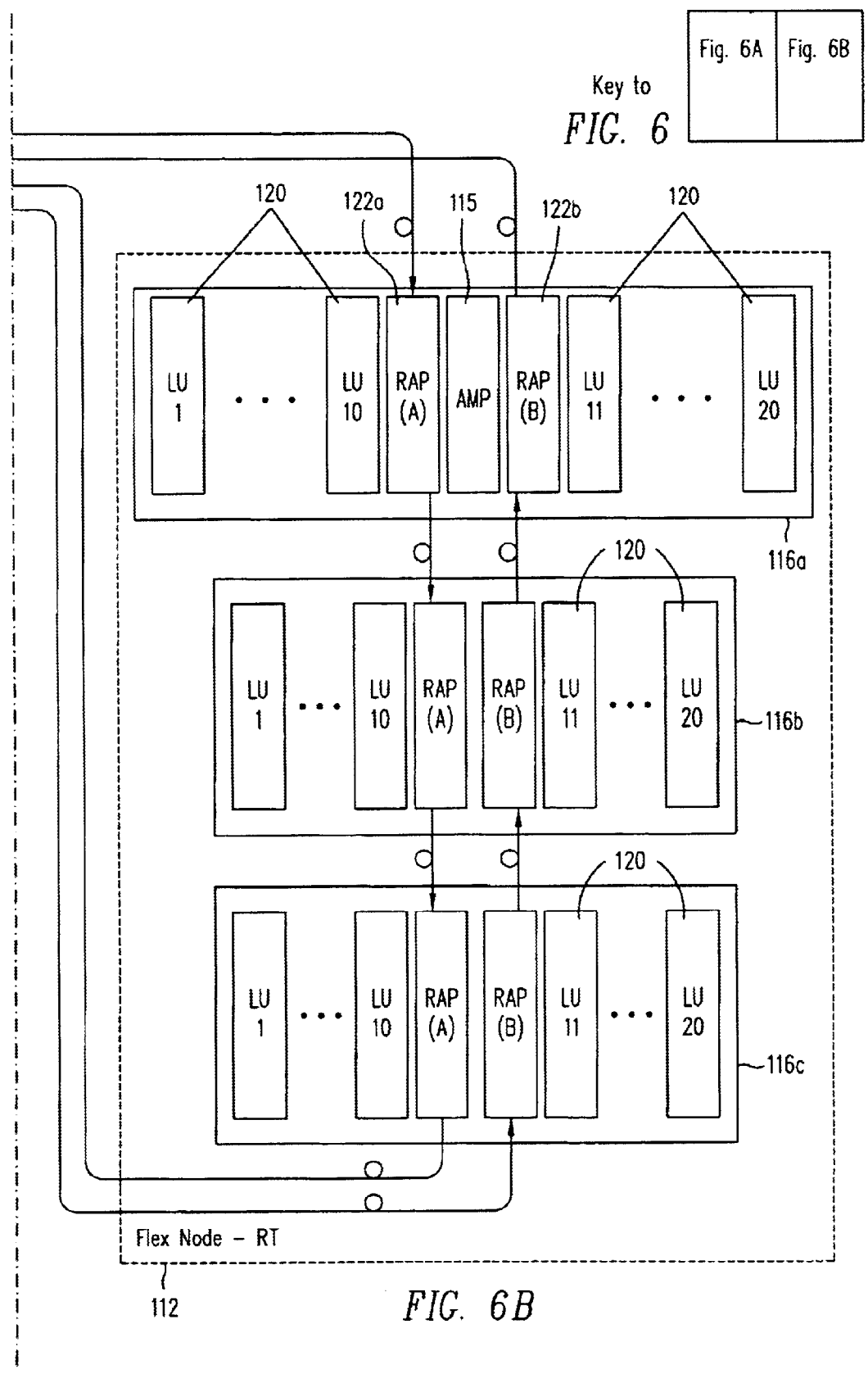

In a typical embodiment of the system of FIG. 6, a circuit board slot of shelf 114a of HN 110 is used for a two port OC-12 circuit boards 118(A), 118(B) that provides dual SONET OC-12 interfaces 113a, 113b when RAP(A) 124a is active, and standby interfaces 113c, 113d if RAP(B) becomes active in the event RAP(A) 124a fails. The SONET interfaces 113a–d can be used to provide connectivity to an Edge/Core Network 111. The line unit 118(A)(B) is coupled through the backplane to RAP(A) 124a through two active serial buses (and to RAP(B) 124b as well through one inactive bus for back-up) operating at 3.11 Gbps. One embodiment of line unit 118 can provide STS, ATM and or PPP transport modes. An enhancement to allow the transport of both (point-to-point protocol (PPP) and ATM can be provided via the Pre-emptive ATM over PPP method. In this application the HN 110 is used as either a transport or access multiplexer. Line unit 118 can also be used for communication between the HN 110 and FN 112.

FIG. 6 illustrates that another slot of shelf 114a of host node 110 is used for a line unit 119(A), 119(B) that provides for communication between host node 110 and RAP(A) 122a (or RAP(B) 122b) of flex node 112. One embodiment of line units 119(A) and 119(B) can have up to four OC-3 ports, thereby providing multiple SONET OC-3 interfaces that can be used to communicate between the host node 110 and flex node 112. In this application the host node 110 is typically used as an access multiplexer. Fiber egress to line unit 119 is via four SC connectors. One embodiment of line unit 119 provides STS, ATM and or PPP transport modes. An enhancement to allow the transport of both PPP and ATM can be provided via the Pre-emptive ATM over PPP method.

The circuit board slots of shelves 114a, 116a of nodes 110, 112 can be populated with optical line units as described above or with additional embodiments of line units 118, 120 that provide standard interfaces to several typical forms of data and/or voice traffic sourced by business and residential users. For example, another embodiment of a line unit 120 is a POTS circuit board that supports up to 25 POTS interfaces. The POTS interfaces support both loop and ground start as well as provisionable characteristic loop impedance and return loss. The bandwidth requirements for this board are low and thus only one active and one standby full duplex serial bus running at 3.11 Gbps are required to couple this line unit to the RAP(A) 122*a* and RAP(B) 122*b* respectively.

Another Line Unit that can be used in the system is a 24 port Asymmetric Digital Subscriber Line (ADSL) board that supports 24 Full Rate ADSL interfaces. ADSL is a modem technology that converts existing twisted-pair telephone lines into access paths for multimedia and high-speed data communications. ADSL can transmit up to 6 Mbps to a subscriber, and as much as 832 Kbps or more in both directions (full duplex). The line coding technique used is discrete multi-tone (DMT) and may also function in a G.Lite mode to conserve power. The circuit board does not include POTS splitters, which must be deployed in a sub-system outside of the shelf 116*a*. One embodiment of the 24 port ADSL line unit is constructed with quad port framers. Because the bandwidth requirements for this line unit are typically low, once again only one active and one standby bus running at 3.1 Gbps are required to couple the line unit to the RAP(A) 122*a* and RAP(B) 122*b* of shelf 116*a*.

Another line unit that can be employed with the system of FIG. 6 is a twelve port POTS/DSL combo-board that supports12 POTS and 12 Full Rate ADSL interfaces. The combo-board is the melding of half of a POTS and half of an ADSL line unit as discussed above. The POTS interfaces support both loop and ground start as well as provision able characteristic loop impedance and return loss. The ADSL line-coding technique used is DMT and may also function in a G.Lite mode to conserve power. In one embodiment, quad port ADSL framers may be employed to condition the ADSL traffic. Because the bandwidth requirements for this line unit are typically low, only one active and one standby serial bus running at 31. Gbps are required to interface the line unit with the RAP(A) 122*a* and RAP(B) 122*b* respectively.

Another line unit that can be employed within the system illustrated in FIG. 6 is a twelve port DS-1 board that supports up to 12 DS-1 interfaces. An embodiment of the DS-1 line unit supports DSX-1 interfaces. Optionally, the card supports twelve dry T-1 interfaces. Switching current sources are included to support twelve powered T-1 interfaces. Again, because the bandwidth requirements for this line unit are low, only one active and one standby bus running at 3.1 Gbps are required to connect the line unit to the RAP(A) and RAP(B) respectively. For this line, unit, data traffic flows over a Utopia 2 interface. Control and provisioning information is communicated over a PCI bus. Control and provisioning information for T1 framers/line interfaces is communicated over a serial interface. An edge stream processor (ESP) provides an ATM adaptation layer (AAL) ½ adaptation function for all 12 framer interfaces. The ESP terminates structured DS0 traffic TDM cross-connect switching or time stamps asynchronous DS1 traffic for Hi-Cap transport. The ESP processor is also capable of terminating PPP framed DS1 traffic for either Layer 2 tunneling (L2TP) or Layer 3 routing.

Another line unit 118, 120 that can be used in the system of FIG. 6 is an eight port DS3 board that supports up to 8 DS-3 interfaces. In one embodiment of this line unit, each interface may be provisioned to terminate either an ATM UNI (ATM Unicast), PPP or Channelized Hi-Capacity DS3 service. A routing stream processor supports either ATM or PPP by queuing and scheduling DS-3 traffic for packet transport through the RAP. A DS3_Mapper supports the Hi-Cap DS3 by mapping DS-3 traffic into an STS1 channel for low latency transport through the RAP.

Another line unit 118, 120 that can be used in conjunction with the system of FIG. 6 is a single port STS1 board. In one embodiment of the STS-1 board, a mode selectable single STS1 or DS-3 interface is supported.

Another line unit 118, 120 that can be used in conjunction with the system of FIG. 6 is a single port OC48 Interface board. The single port OC48 line unit provides a single SONET OC-48 interface to provide connectivity to the Edge/Core Network. In this application the HN 110 is used primarily as a transport level add/drop multiplexer. In a preferred embodiment, fiber egress is via two SC connectors. SONET framers provide STS, ATM and or PPP transport modes. An enhancement to allow the transport of both PPP and ATM is provided via a Pre-emptive ATM over PPP method.

Still one more line unit 118, 120 that can be used in conjunction with the system shown in FIG. 6 is a twelve port Fiber to the Business (FTTB) board. The twelve port FTTB assembly provides a single OC-12 SONET interface out and twelve OC-1 SONET interfaces in. In one embodiment of this line unit, a unique integrated splitter arrangement allows sharing of the single laser diode over twelve business subscribers. Twelve discrete PIN diode receivers will be provide to allow a single interface per each of the twelve business subscribers. This method allows simple and inexpensive fault isolation and efficient bandwidth management amongst the entire pool of business subscribers. The interface provided to the subscriber is a single fiber with a single lambda down and a separate lambda up. This arrangement reduces fiber bulk and cost. The dual Lambda arrangement allows a simpler splitter implementation to be realized in a "silica on silicon" waveguide device. The FTTB line unit is coupled through the backplane to RAP(A) 124*a* through one active serial bus (and to RAP(B) 124*b* as well through one inactive bus for back-up) operating at 3.11 Gbps.

Thus, it can be seen from the foregoing discussion that the network element is designed to permit the largest number of customer applications to be supported within a single shelf HN and single shelf FN. While the system of FIG. 6 is optimized towards a single shelf per node configuration, expansion to a multi-shelf per node configuration is also supported in a deterministic and modular fashion. Typically co-located shelves are connected in a Uni-directional Path Switched Ring (UPSR) arrangement via the RAP mounted optics as illustrated in FIG. 6 by the addition of shelves 114*b*, and 114*c* to HN 110. This provides a simple, incremented means of local expansion. Local expansion can also be implemented in a point-to-point fashion, however, at the expense of slots and cost. A single HN 110 may host many FNs 112 in a variety of topologies. FNs 110 may be subtended from an NH 110 is point-to-point, linear chain, branch and continue, UPSR or bi-directional line switched ring (BLSR) arrangement. An extremely large network of over 20,000 subscribers may be constructed from the HN/FN hierarchy as illustrated in FIG. 6.

Figure 7:
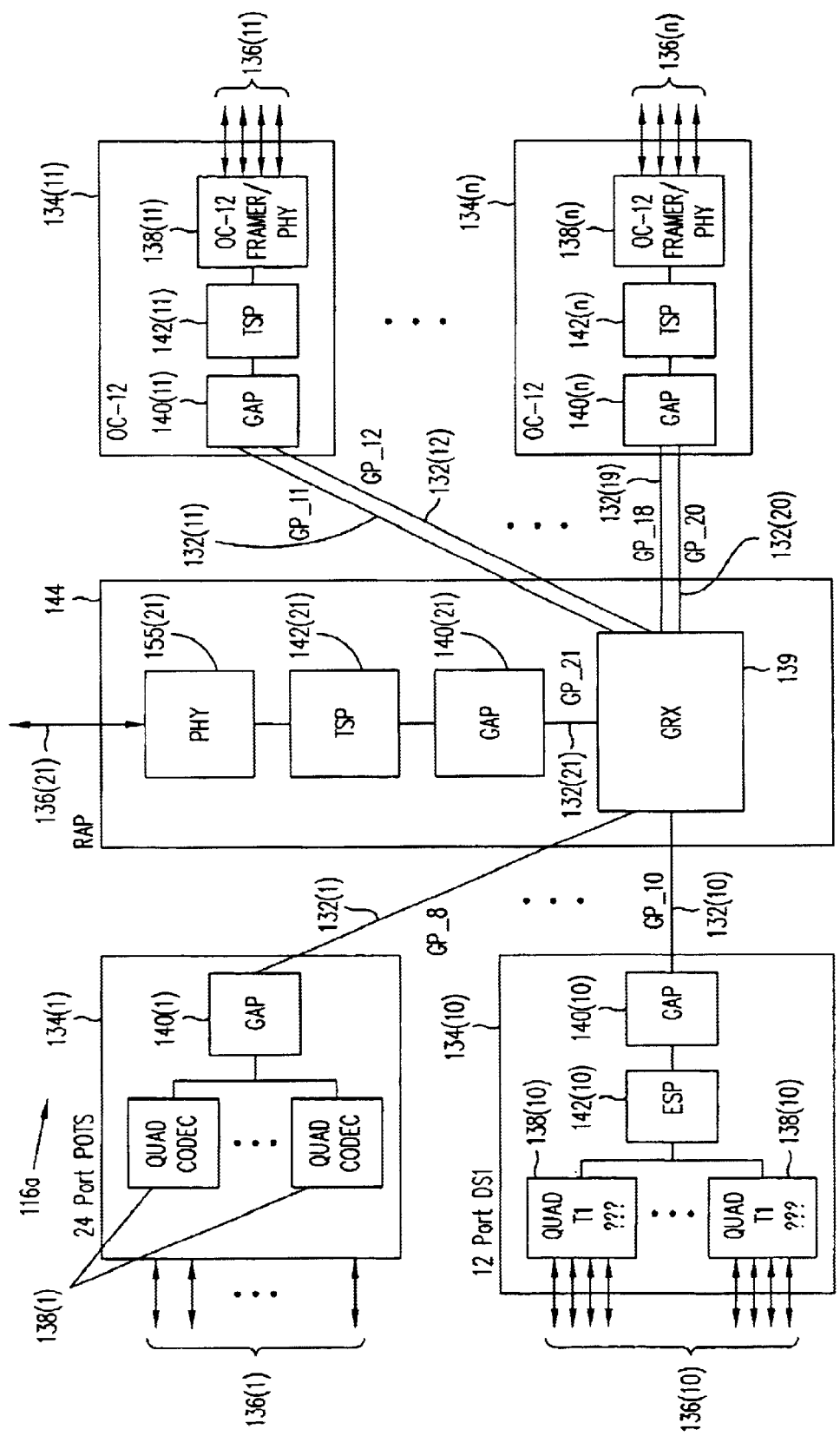
FIG. 7 illustrates line units in accordance with the invention that transfer information to each other via a switch unit called GRX in a routing and arbitration processor (RAP).

One possible combination of specific line cards is illustrated in FIG. 7 to illustrate the versatility of the system. Specifically, line cards 134(1)–134(10) and 124(11)–134(*n*) that transfer information to each other via a switch unit 139

(called "GRX") that is located in a routing and arbitration processor (RAP). In the illustrated embodiment (FIG. 7), there are twenty-four I/O ports for GRX 139 that are coupled to the backplane. Twenty of the I/O ports couple line cards 134(1)–134(n) to the GRX 139 through full-duplex serial buses 132(1)–132(20). One port 132(21) couples RAP(A) 144 to the outside world through bus 136(21). Another port that is not shown couples RAP(B) (also not shown) to the outside world and the last port (not shown) couples the AMP (not shown) of shelf 116a to the outside world. In FIG. 7, each of line cards 134(1)–134(n) is shown with both its input and output units together, in contrast to FIG. 8 which is discussed below.

As shown in FIG. 7, in this illustrative embodiment, twenty-four port POTS unit 134(1) interfaces to the GRX 139 over serial bus GP_1 113(1), and has twenty-five telephone interface inputs 136(1) coupled to five quad codecs 138(1), which in turn interface with GAP 140(1). A twelve port DS1 unit 134(10) having twelve DS1 interfaces coupled to three quad T1 frames 138(10), the outputs of which are processed by ESP 142(10), sends and receives conditioned traffic through GAP 140(10) to GRX 139 over serial bus GP_10 132(10). Four port OC3 units 134(11) and 134(n) are each coupled to GRX 139 over two serial buses GP_11 132(11), $GP_{13}$ 12 132(12) and GP_19 132(19), GP_20 132(20) respectively. Each unit provides a total bandwidth equivalent to OC-12, handling bi-directional OC-3 traffic over OC-3 I/Os 136(11) and 136(n) respectively. Line units 134(11) and 134(n) interface with the OC-3 traffic by way of OC-12 framer/Phys 138(11) and 138(n) respectively and data is transferred to and from the GRX 139 by way of GAPs 140(11) and 140(n) respectively.

Figure 8:
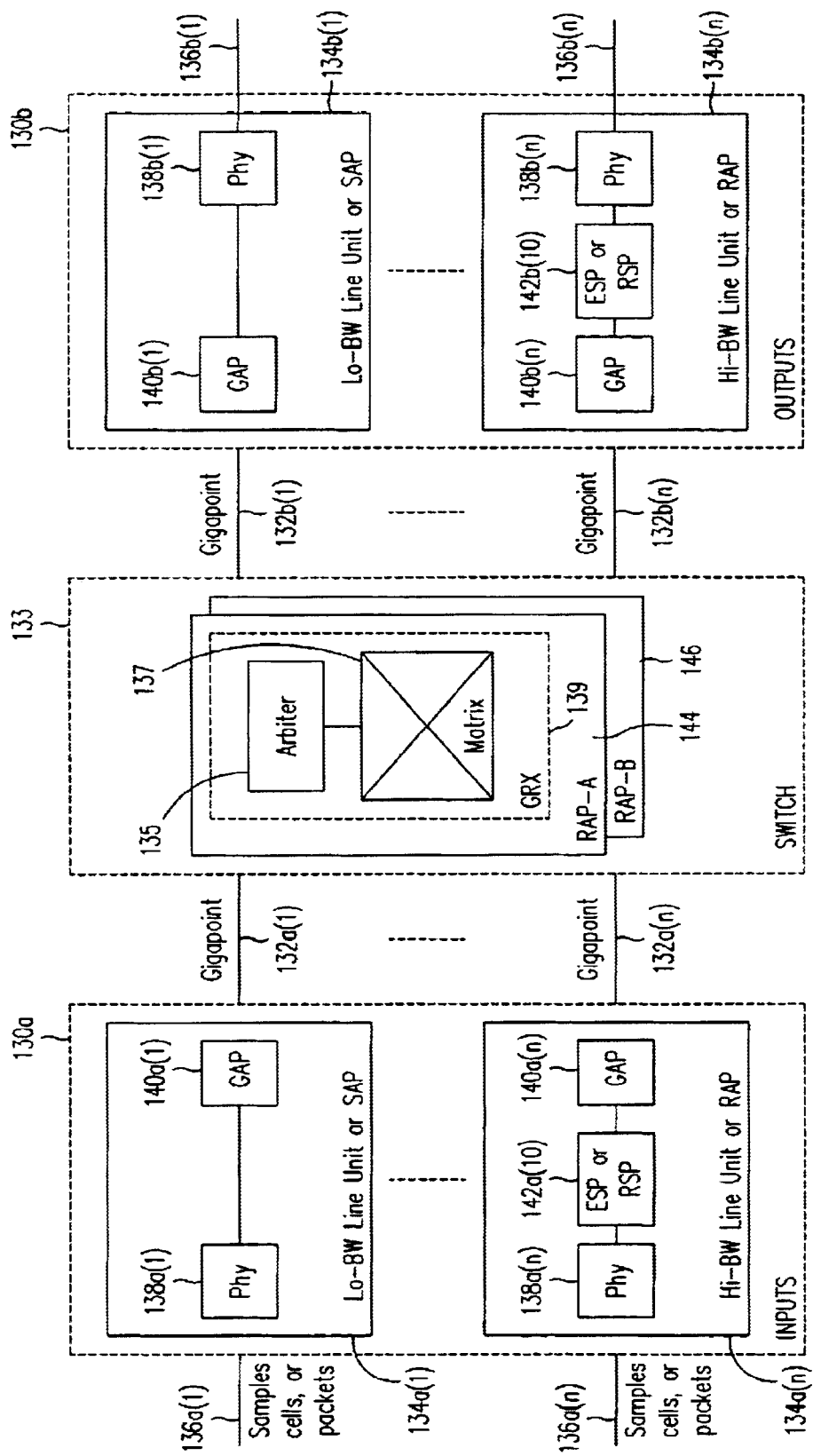
FIG. 8 illustrates line units of the type illustrated in FIG. 7 shown split out into an input side and an output side.

Line cards 134(1)–134(10) and 134(11)–134(n) (FIG. 7) are shown split out into an input side 130a and output side 130b for clarity in FIG. 8 (which is also shown without the AMP). Those of skill in the art will recognize that the input and output paths of each of line units 134a(1)–134a(n) and 134b(1)–134b(n) respectively, will typically reside on one circuit board (also called "card") and may even share some of the same circuits. Each of output paths 134b(1)–134b(n) produces one of outputs 136b(1)–136b(n) in the form of cells, samples and packets. The line cards can be of a lower bandwidth (e.g. line units 134a(1) and 134b(1)), such as the twenty-four port POTS unit, the twenty-four port DSL unit, and the twelve port POTS/DSL combo unit as previously described. Some of the line units are high bandwidth (e.g. line units 134a(n) and 134b(n)), such as the twelve port DS1/T1 unit, the eight port DS3 unit, and the ST-1, OC-3, OC-12 and OC-48 units, all of which require an ESP/RSP such as ESP/RSP 142a(10), 142b(10) to perform pre-processing of the traffic.

Input line units 134a(1)–134a(n) illustrated in FIG. 8 perform the function of interfacing with the physical layer of a data source to receive data traffic over inputs 136a(1)–136a(n) in the form of cells, samples or packets, depending upon the source type, and then grooming the traffic through its circuitry (called GAP which is an abbreviation for GigaPoint Access Processor) 140a(1)–140a(n) so that it can be switched by the matrix 137 of switch 133 to any one or more of output lines 134b(1)–134b(n). Output line units 134b(1)–134b(n) perform the function of taking the routed traffic and converting it back to the physical layer format expected by the receiver to which it is coupled. The interfacing function is represented by input path circuits Phy 138a(1)–138a(n) and output path circuits Phy 138b(1)–138b(n). The traffic for higher bandwidth traffic sources often requires an additional layer of circuitry 142a(10), 142a(10) for grooming the data traffic, such as an RSP, an ESP and/or quad framers.

Each of input path GAPs 140(a)–140a(n) for each of input line units 134a(1)–134a(n) transmits groomed and serialized data traffic over one or more high-speed serial input buses 132a(1)–132a(n) to the switch 133, where the serialized data is converted to parallel data for switching. With respect to each output line unit 134b(1)–134b(n), a transmit portion (not shown) of output path residing within switch 133 serializes switched data traffic and transmits it over high-speed serial output buses 132b(1)–132b(n) to the receive portion of each GAP 140b(1)–140b(n) residing in the line unit output paths. From there, the data traffic is adapted back to the physical layer protocol spoken by the designation for the outgoing traffic. Each of input path GAPs 140a(1)–140a(n) of each line unit provides data to switch 133 as asynchronous packet traffic, TDM and multicast synchronous packet traffic, and channelized STA data traffic. Likewise, each of output path GAPs 140b(1)–140b(n) of each line unit receives data in one of the foregoing forms from the switch 133, and adapts it to the requisite physical layer of the traffic destination.

The switch 133 includes the active RAP(A) 144 and back-up RAP(B) 146. Each RAP includes a switch unit (called GRX which is an abbreviation for GigaPoint Routing Cross-connect) 139. GRX 139 further includes an arbiter 135 and a matrix 137 by which the conditioned data traffic arriving over the input side of any of the serial buses is switched to the appropriate output side of one or more of the serial buses coupled to the destination for that conditioned traffic.

Those of skill in the art will recognize that any combination of the line units described herein, or any that are designed to interface with and condition data traffic to be transmitted and received over a backplane bus by way of a GAP in the form of asynchronous packet traffic, TDM and multicast synchronous packet traffic, and channelized STS data traffic can be employed in shelf 116a of FIG. 8.

The present invention is able to serve a broad range of network access functions because it handles both synchronous and asynchronous classes of traffic over a common fabric. In prior art multi-class solutions, these types of traffic are typically handled separately over separate bus systems. Such a solution to the problem is not desirable because though it makes handling the traffic simpler, it does not provide advantages of flexibility and lower cost.

Figure 9:
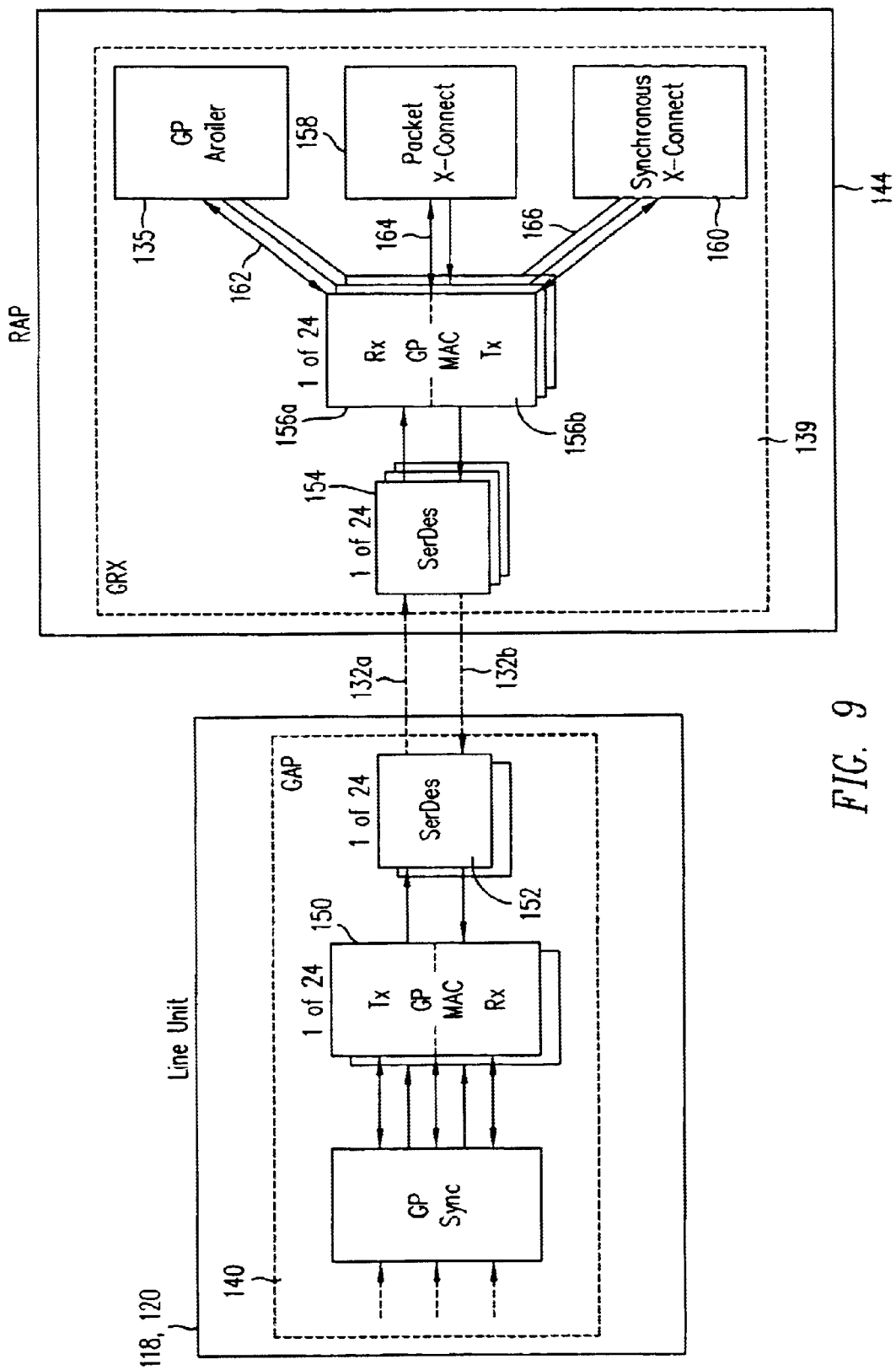
FIG. 9 illustrates a conceptual block diagram of the present invention that facilitates seeing the flow of different types of traffic through a common switch fabric.

With reference to FIG. 9, a conceptual block diagram of the present invention is depicted that facilitates seeing the flow of the different types of traffic through the common switch fabric. Line unit 118, 120 consists of GAP 140 (both transmit and receive paths). As previously discussed, GAP 140 interconnects traffic from the serial (GigaPoint) bus 132a, 132b (transmit and receive) to physical interfaces that make up part of the line units such as OC-48, POTS etc. GAP 140 receives and transmits TDM and packet base traffic over the GigaPoint Bus 132. GAP 140 also transmits local queue status over the GigaPoint bus 132. It receives control and arbitration information over the GigaPoint Bus 132, and maps POTS Codec traffic into an internal packet format. The GAP supports VOQ with 2 classes of service toward the GigaPoint bus. The GAP supports AAL-5 by way of a Hardware SAR (Segmentation and Reassembly) engine, transmitted of SONET transport overhead bytes and implements a time slot interchange (TSI) for DS0 traffic. For more information regarding the GAP, refer to the "GigaPoint Access Processor (GAP) ASIC Functional Specification," attached hereto as Attachment G.

The GAP includes a Transmit/Receive GP MAC (Media Access Controller), that handles transmitting and receiving communicating both STS and packet traffic through the serial high speed GigaPoint bus through SerDes (Gigabit Ethernet serializer/deserializer) 152. The mixture of packet and STS traffic is simply squeezed down and transmitted over a high speed link to transport the traffic between the GAP, across the backplane of the system, and the common switch fabric represented by GRX 139. Another transmit/ receive SerDes 154 resides on the GRX 139 that is interfaced with another receive/transmit MAC 156. For information regarding the details regarding the high-speed bus architecture, refer to the "GigaPoint Bus Hardware Architectural Specification," which is attached hereto as Attachment F.

In the GRX 139, the receive GP MAC 156*a* accepts combined asynchronous and synchronous traffic from a line unit through the SerDes core and distributes it to the packet crosspoint 158 and synchronous crosspoint 160 respectively. STS bytes and synchronous packets (TDM and multicast) are driven to the synchronous crosspoint 160 over a 40-bit parallel bus. Unicast packets are sent over a 64-bit FIFO interface to the packet crosspoint 158. An eight-bit packet arrival word is extracted by each receive MAC and driven to the arbiter 135. The arrival word is sent with an arrival strobe, as well as downstream GigaPoint and grant backpressure signals.

The GRX transmit GigaPoint MAC 156*b* receives data bound for the serial bus to line unit 118, 120 over three buses; the 64-bit asynchronous packet bus 164, the 40-bit synchronous bus 166 and the 8-bit arbiter bus 162. Asynchronous bus data is read from the packet crosspoint's output FIFO. Synchronous data (STS, TDM and multicast packets) is received from the synchronous crosspoint at timeslots relative to superframe sync and in accordance with bandwidth allocation of the particular link by way of a channel map configuration. Packet grain information is transported from the GigaPoint arbiter 135 to the TX MAC in a manner similar to that of packet arrival information.

For more information regarding the implementation of the GP MAC, refer to the "GigaPoint Media Access Controller (GP MAC) Module Specification" attached hereto as Attachment E.

Figure 12A:
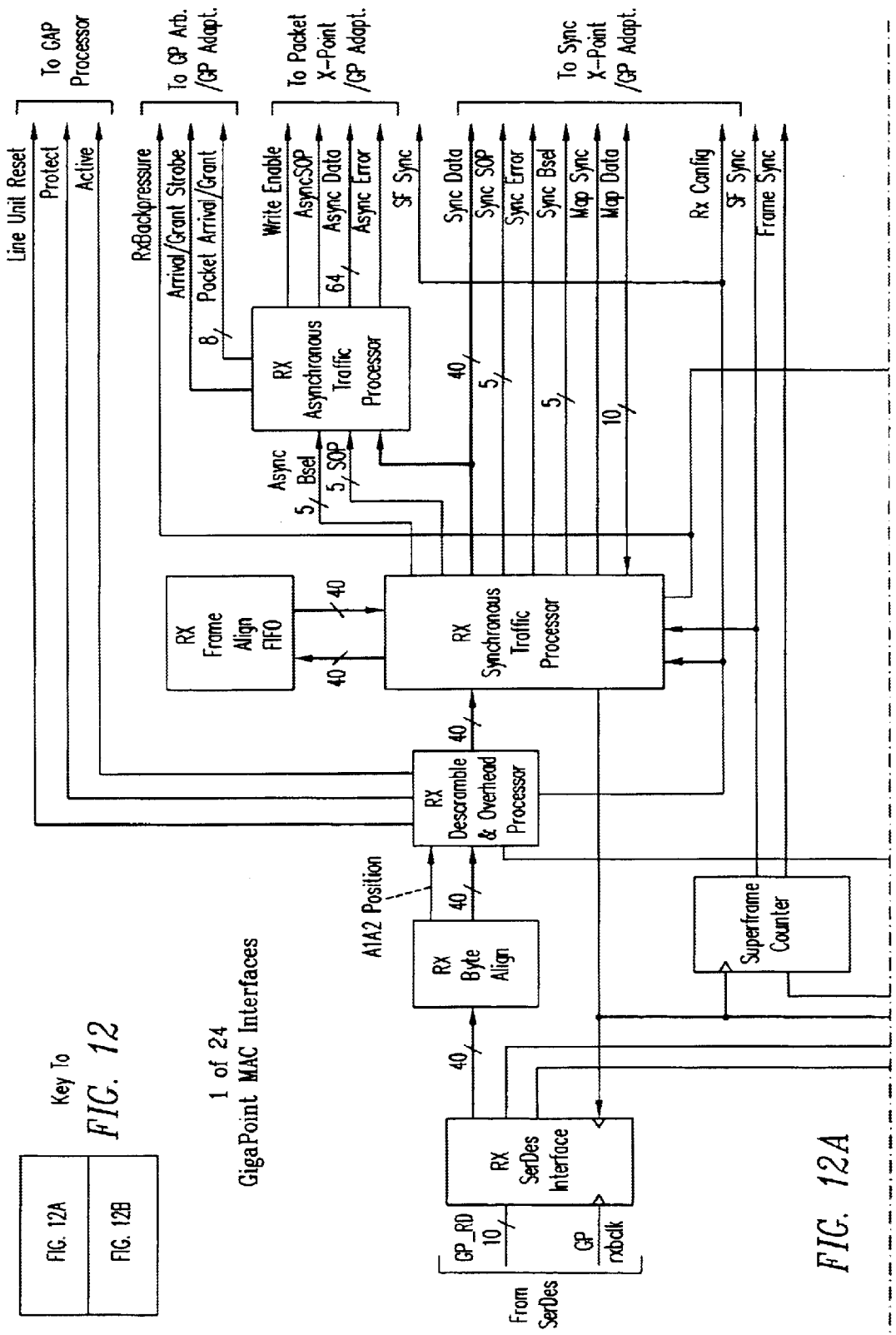
FIG. 12 illustrates a media access control (MAC) module used in one embodiment of a cross-connect.
Figure 12B:
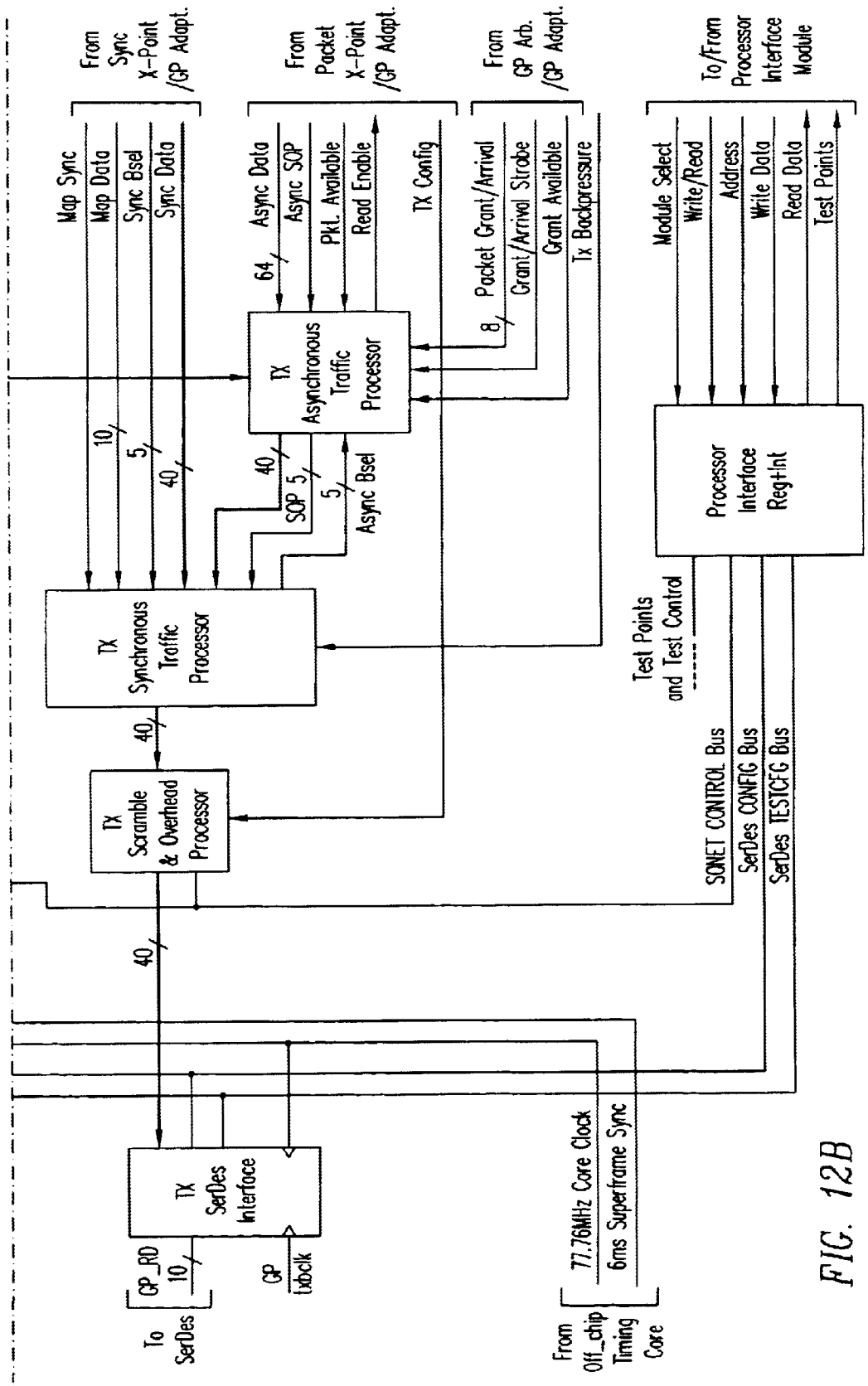

The GigaPoint MAC module is the common interface between the SerDes and the core logic of both the GRX and GAP ASICs. Twenty-four GP MAC interfaces in each GRX ASIC provide GigaPoint connectivity to line units, local RAP optics, the AMP card and the redundant RAP. As depicted in FIG. 12, two GP MAC interfaces at the GAP ASIC provides GigaPoint connectivity to each redundant RAP card.

In the GRX, the receive GP MAC accepts GigaPoint traffic from a line unit through the SerDes core and distributes it to the packet crosspoint or synchronous crosspoint based on traffic type. STS bytes and synchronous packets (TDM and multicast) are driven to the synchronous crosspoint over a 40-bit parallel bus. Unicast packets are sent over a 64-bit FIFO interface to the packet crosspoint. An eight-bit packet arrival word is extracted by each receive MAC and driven to the GigaPoint arbiter. The arrival word is sent with an arrival strobe, as well as downstream GigaPoint and grant backpressure signals.

The GRX transmit GigaPoint MAC receives data bound for the GigaPoint over three buses; the 64-point asynchronous packet bus, the 40-bit synchronous bus and the 8-bit arbiter bus. Asynchronous bus data is read from the packet crosspoint's output FIFO. Synchronous data (STS, TDM and multicast packets) is received from the synchronous crosspoint at timeslots relative to superframe sync and GigaPoint channel configuration. Packet grant information is transported from the GigaPoint arbiter to the TX MAC is a manner similar to that of packet arrival.

In the GAP ASIC, two redundant GP MAC TX/RX modules interface to redundant RAPs within the C7 shelf. All three buses, asynchronous, synchronous and packet arrival/grant, interface to the GAP's core logic through the GigaPoint Adaptation module. The GigaPoint Adaptation module interfaces STS traffic to the Telecom Interface module, TDM and multicast to the TDM aligner/TDM output Queue, and packet arrival/grant information to/from the GAP's Queue Manager module.

The GigaPoint receive path begins with the RX SerDes interface. 3.1104 Gbps data is received over 10 single-ended inputs along with a receive clock. The RX SerDes interface converts the 10-bit word at 311.04 MHz to a 40-bit word at 77.76 MHz. For the external SerDes, the RX SerDes interface output is clocked by the core 77.76 MHz clock. For the ASIC SerDes core, the RX SerDes interface output is clocked by a 77.76 MHz clock derived from the SerDes receive clock. The receive interface transitions to the core block domain at the RX frame align FIFO.

The RX SerDes interface drives the RX byte align module. The GA1/GA2 framing pattern in the GigaPoint overhead channel is identified here. A 40-bit GA1G2 position vector is generated and driven to the RX descramble and overhead processor along with the receive data.

The RX descramble and overhead processor module performs a barrel-shift operation on the receive data based on the GA1GA2 position vector. Once every frame, the GigaPoint overhead system (GB1, GK1, GS1) are extracted from the receive data. A running BIP-8 calculation from the previous frame is compared with the current frame's GB1 overhead byte. Line unit reset and frame count information is read from overhead byte GK1. The GK1 frame count is compared with the frame counter from the timing core frame sync. Active/Protect and GigaPoint channel configuration state are read from overhead byte GS1 and driven to GRX/GAP core logic. The 5-bit user state would field is written to a RAP processor-accessible register. Receive data is driven to the RX synchronous traffic processor.

The RX synchronous traffic processor delineates STS, sync packet and async packet traffic types. STS traffic is identified through GigaPoint channel map information from the GRX Synchronous crosspoint or GAP GigaPoint adaptation module. Sync packets in synchronous channels are framed by 125 us frame sync. Asynchronous packets are framed by 6 ms superframe. After initial start-of-packet detection at frame/superframe sync, modulus-64 byte counters maintain async packet delineation. Backpressure state is read from GigaPoint headers of both sync and async packets. Receive backpressure is driven to the TX asynchronous traffic processor as well as off-module. Synchronous traffic is driven out of the GP MAC with a synchronous byte select signal (Sync Bsel). Sync Bsel identifies which of the five byte lanes in the 40-bit synchronous output data bus carries sync packets. Asynchronous traffic, along with Async Bsel and async start-of-packet (SOP) is driven to the RX asynchronous traffic processor.

The asynchronous traffic processor converts the 40-bit data bus to 64 bit width. It further acts as a FIFO write controller to the GRX packet crosspoint's or GAP GigaPoint adaptation module's input FIFO. The asynchronous traffic processor also extracts the packet arrival word at the GRX and the packet grant word at the GAP ASIC.

GigaPoint transmit data is generated from the following five sources:

Packet grant data from the GRX GigaPoint arbiter

Packet arrival data from the GAP GigaPoint adaptation module

Asynchronous packets from the GRX packet crosspoint, or GAP GigaPoint adaptation module Synchronous packets and STS data from the GRX synchronous crosspoint, or GAP GigaPoint adaptation module GigaPoint overhead state data from the processor interface registers Packet grant/arrival data is encoded by the TX asynchronous traffic processor. The grant/arrival strobe indicates new grant/arrival data for transport. The TX async traffic processor receives a packet available signal indicating a complete packet is present in the GRX packet crosspoint output FIFO, or the GAP GigaPoint adaptation module output FIFO. The async traffic processor is the FIFO read controller. Upon receiving the packet available, the async traffic processor reads the start-of-packet bus and output FIFO data eight bytes at a time. It then converts the data to the 40-bit bus width based on the Async Bsel bus received from the TX synchronous traffic processor. Backpressure from the upstream path disables reads of the output FIFO on a packet boundary.

The TX synchronous traffic processor combines the data from the TX async traffic processor and the 40-bit sync packet/STS data from the GRX synchronous crosspoint/GAP GigaPoint adaptation module. STS channels and sync packet channels are identified by the map data from the sync crosspoint. Asynchronous packets may use synchronous GigaPoint channels when no synchronous packets (TDM or multicast) are present.

The TX synchronous traffic processor drives the combined data (STS, sync packet and async packet with arrival/grant data) to the TX scrambler and overhead processor. The overhead processor inserts the overhead state data (Active/protect, line unit reset command, 0–47 frame count, GigaPoint channel configuration page and user state word) into the overhead GK1 and GS1 timeslots. The TX synchronous traffic processor also calculates and inserts the BIP-8 GB1 byte and GA1/GA2 framing bytes. The GigaPoint transmit data, excluding GA1/GA2 framing is then scrambled using a SONET $2^{48}-1$ algorithm to maintain 1's density for the receive SerDes PLL. The completed 40-bit GigaPoint transmit data is driven to the TX SerDes interface. The TX SerDes interface clocks in the transmit data words at 77.76 MHz. The transmit data is converted from 40 bits at 77.76 MHz to 10 bits at 311 MHz. The 10-bit transmit word is driven to the SerDes one. The 311 MHz transmit clock is generated by the off-chip timing core.

The packet status interface is a strobe-based interface used to relay packet arrival/grant information between the GigaPoint MAC and core ASIC logic. In the GRX ASIC, the packet status interface drives packet arrivals to, and receives packet grants from, the GigaPoint arbiter. In the GAP ASIC this interface carries packet grants to, and packet arrivals from, the GigaPoint Adaptation module. Packet status signals at the GRX and GAP top levels reflect their relative functions. As a result, top level packet status signals for GRX and GAP are different. Both signal names are listed below

TABLE

Packet Status Receive Interface Signals

| GRX Signal | GAP Signal | Width | Direction | Description |
|---|---|---|---|---|
| mac_gpN_pkt_arr[7:0] | mac_gpN_pkt_gt[7:0] | 8 | Output | 8-bit packet arrival word from each GigaPoint. |
| mac_pkt_arr_strbN | mac_pkt_gt_strbN | 1 | Output | Packet arrival strobe from each GigaPoint. Qualifies packet arrival word. |
| mac_bp_inN | mac_bp_inN | 1 | Output | GigaPoint backpressure received from far end GP TX MAC |
| mac_grant_bpN | N/A | 1 | Output | GigaPoint grant backpressure received at GRX from far end GAP |

Note: All signals are active high. N=GigaPoint number, one bus per GigaPoint interface. The packet arrival field reports the arrival of packets at the line unit to the GRX's VOQ image function within the GigaPoint arbiter. The packet arrival word appears at the GRX receive and GAP transmit interfaces. The packet arrival field includes VOQ ID, message type and valid information as follows:

| 7 | 6 | 5 | 4 | 3 | 2 | 1 | 0 |
|---|---|---|---|---|---|---|---|
| TYPE1 | TYPE0 | VOQ5 | VO4Q | VOQ3 | VOQ2 | VOQ1 | VOQ0 |

WOQ5-0 VOQ identifier bits. When the valid bit is active, this field indicates in which VOQ, based on output port, the arriving packet will be stored at the line unit.

TYPE Arrival type bits. The type bits transport arrival state as described below:

| Type 1 | Type 0 | |
|---|---|---|
| 0 | 0 | Normal packet arrival. The VOQ identifier indicates which queue has received a packet. |
| 0 | 1 | Initiate VOQ Audit |
| 1 | 0 | Flush. The VOQ identifier indicates which VOQ count should be cleared. |
| 1 | 1 | Terminate Grant Audit |

The packet grant field is sourced by the GRX's GigaPoint arbiter. It identifies which packet should be driven over the upstream GigaPoint to the GRX based on the grant VOQ ID. The packet grant word appears at the GRX transmit and GAP receive interfaces. Because the GAP ASIC at the line unit may cache grants, the next upstream packet may not be the last packet granted.

| 7 | 6 | 5 | 4 | 3 | 2 | 1 | 0 |
|---|---|---|---|---|---|---|---|
| TYPE1 | TYPE0 | VOQ5 | VOQ4 | VOQ3 | VOQ2 | VOQ1 | VOQ0 |

| Type 1 | Type 0 | |
|---|---|---|
| 0 | 0 | Normal packet grant. The VOQ identifier indicates which queue is granted. |
| 0 | 1 | Terminate VOQ Audit, Initiate Grant Audit |
| 1 | 0 | Flush. The VOQ identifier indicates which VOQ count should be cleared. This type can only be generated from the TX Insert register. Flush words from the arbiter will not be passed to the GigaPoint. This "flush filter" function is disabled at the GAP. Packet arrivals with the flush type are transported by the GAP TX MAC. |
| 1 | 1 | Terminate Grant Audit |

VOQ5-0 are VOQ identifier bits. When the valid bit is active, this field indicates which line unit VOQ is granted access to the upstream GigaPoint.

Within the GRX, the receiver drives data from one SerDes to three different modules.

They are:
Packet arrival and backpressure data to the GigaPoint Arbiter
Asynchronous packets to the Packet Crosspoint
STS channels and synchronous packets to the Synchronous Crosspoint In the GAP ASIC, SerDes receive data is driven to a single module, the GigaPoint Adaptation Module. Both redundant GP MAC modules drive the GigaPoint Adaptation Module. Its function is to select the GigaPoint data from the GP MAC interface to the active RAP. Additional receive state signals are provided for the GAP's host processor. They relate the current active state of each RAP and allow a RAP to command a reset of the line unit's application host processor.

A synchronous packet processor, delineates sync packets based on STS/sync channel map and the packet type field in the packet header. The map control counter is reset at frame sync and counts from 0 to 11. A decode of the map control counter generates the receive map sync to the sync crosspoint. Using map sync as a reference, the sync crosspoint drives the 10-bit receive channel map to the MAC. Over twelve clocks, all 120 bit of the receive GigaPoint channel map are transferred to the MAC.

A synchronous packet counter keeps track of byte position within synchronous packet slots. At frame sync, packet counter is reset. On each 77.76 MHz clock, the counter interments based on the number of sync channels in receive channel map word. When the counter increments from 0 to 1, the packet type field is registered from the receive data. If the packet type is TDM or multicast, then for sync, packet bytes 0–63, the synchronous receive byte selects are driven active to the sync, crosspoint. If the packet type field indicates idle, then sync sop and sync bsel are driven for idle sync byte 0. Sync bsel is idle for the rest of the sync packet slot. During sync, packet bytes 1–63 are async, receive byte selects (async bsel) are driven active to the receive async, packet processor. The remaining sixty-three bytes of an idle sync, packet slot are available for transport of async, packet bytes. The sync packet controller identifies the sync packet header bytes from the packet counter and the receive channel byte select from the sync crosspoint. The rx header bus is driven to the HEC check block along with the receive data on the test rdat bus.

The data backpressure (mac bp in) and grant backpressure (grant bp) are read from the sync packet header and driven to the receive arrival processor where they are ORed with backpressure signals from the async packet headers. The packet arrival field from the packet header is registered and driven out the sync arr data bus. If the packet arrival valid bit is set, the sync arr strb output is driven for one 77 MHz clock period. The sync packet controller generates mac rx dat, mac rx byte sel, and mac rx sop dat and and packet framing signals to directly to the synchronous crosspoint. When an idle packet is received, the byte select signals remain inactive. The synchronous start-of-packet signal is generated to the sync crosspoint regardless of idle state. The received payload, including the idle packet type field in byte 0 and potential async packet data are driven to the sync crosspoint.

The receive packet arrival processor combines packet arrival messages from the synchronous packet processor and asynchronous packet processor into a single packet arrival interface to the GigaPoint arbiter, Packet arrival messages are queued in a two input, two word deep memory implemented in registers.

The GigaPoint transmitter sub-module, contains the parallel crosspoint to transmit SerDes interface function. This sub-module is instantiated once for each GigaPoint interface, twenty-four instances for the GRX and two instances for the GAP. Within the GRX, the transmitter drives the SerDes with data from three different modules. They are:

Packet grant and backpressure data from the GigaPoint Arbiter
Asynchronous packets from the Packet Crosspoint
STS channels and synchronous packets from the Synchronous Crosspoint In the GAP ASIC, transmit data is sourced two GigaPoint MACs from a single module, the GigaPoint Adaptation Module. The same transmit data is driven through the GP MACs to both redundant RAP cards.

A transmit asynchronous packet processor consists of a packet crosspoint output FIFO read controller, async packet assembler and HEC generator.

The transmit FIFO read controller reads eight-byte transmit data out of the output FIFO. It contains a word counter that is preset by start-of-packet on a FIFO read. When a word req request is received from the transmit assembler, the FIFO controller tests packet available. If packet available is asserted, a word is read from the FIFO and the word counter is incremented. For the next requests, a read is performed and the counter is incremented. After the word counter rolls over, the next word request will again require a packet available.

The assembler stores a 64-bit transmit data word from the FIFO controller. As sync byte selects are received, the assembler selects bytes from the 64-bit register to populate the 40-bit cb tdat bus. When the FIFO read controller does not return a 64-bit data word to a word request, the assembler counts 64 active async byte selects before requesting another FIFO word.

On the last word count, a request is generated to the grant processor for the next packet grant word. If a response is not received within two clock periods, no packet grant is inserted into the packet header and the grant valid bit is negated. Receipt of a grant word sets the valid bit and writes the grant to the header. The word count is reset every 6 ms superframe. The async sop signal is generated from this counter. An end of superframe signal (end of sf) from the scrambler block's frame, row, and column counters ensures that a partial packet is not requested prior to the superframe boundary.

A transmit async, packet counter keeps track of byte position within asynchronous packet slots. At superframe sync, the async, packet counter is reset. On reach 77.76 MHz clock, the counter interments based on the number of async channels provisioned. Async. channels are identified in the receive channel map word.

In the GAP, each packet header's HEC field is calculated and inserted into the packet header. The HEC generator receives the transmit packet along with start-of-packet and byte selects. It begins CRC-8 calculation on the SOP byte and continues on each active byte select until it reaches a count of fifteen. On the sixteenth count, the CRC-8 value is multiplexed into the transmit data stream. The resulting data and pipeline delayed sop signal are drive to the sync packet processor.

The TX MAC receives grant words from the GRX arbiter and arrival words from the GAP. The grant/arrival word in received and validated with the arb pkt gt strb signal. The async processor buffers up to five grants. If the grant buffer reaches a fill level of two, the grant buffer available signal, mac gay, is negated to the arbiter. The additional three grant buffer depth is for MAC grant insertion, audit grants that are not backpressured by mac gav, and one buffer for synchronization to the arbiter cycle time (mac gav is only read by the arbiter once every arbiter cycle). The grant processor receives requests from async and sync packet processors. Grant words are issued on a first come, first serve basis. The transmit synchronous traffic processor receives transmit data from two sources, the sync crosspoint and the MAC's async processor. STS channels are identified by the channel map received from the sync crosspoint. STS timeslots are transported straight through the sync processor. The sync packet function is divided into three blocks; the packet mux, the sync header generator, and the grant insertion block.

A sync packet assembler receives synchronous packets and STS data from the sync crosspoint and multiplexes async packets into the stream based on the channel map and the state of the sync packet slots. Async data is muxed into idle sync packet bytes 1–63. Idle sync packet byte 0 always carries a value of '00' indicating an idle sync packet. The sync assembler detects errors in the routing map by comparing them to its port ID. Routing errors are reported to the processor interface and the failing packet's packet type field is set to idle. The assembler also makes requests to the grant processor for grant words to insert into active sync packets. As with the async assembler, if a grant word is received within two clocks, the valid bit is set and the word is inserted. If no grant word is received, the valid bit is cleared. The assembler's transmit data output drives the sync HEC generator.

Figure 10B:
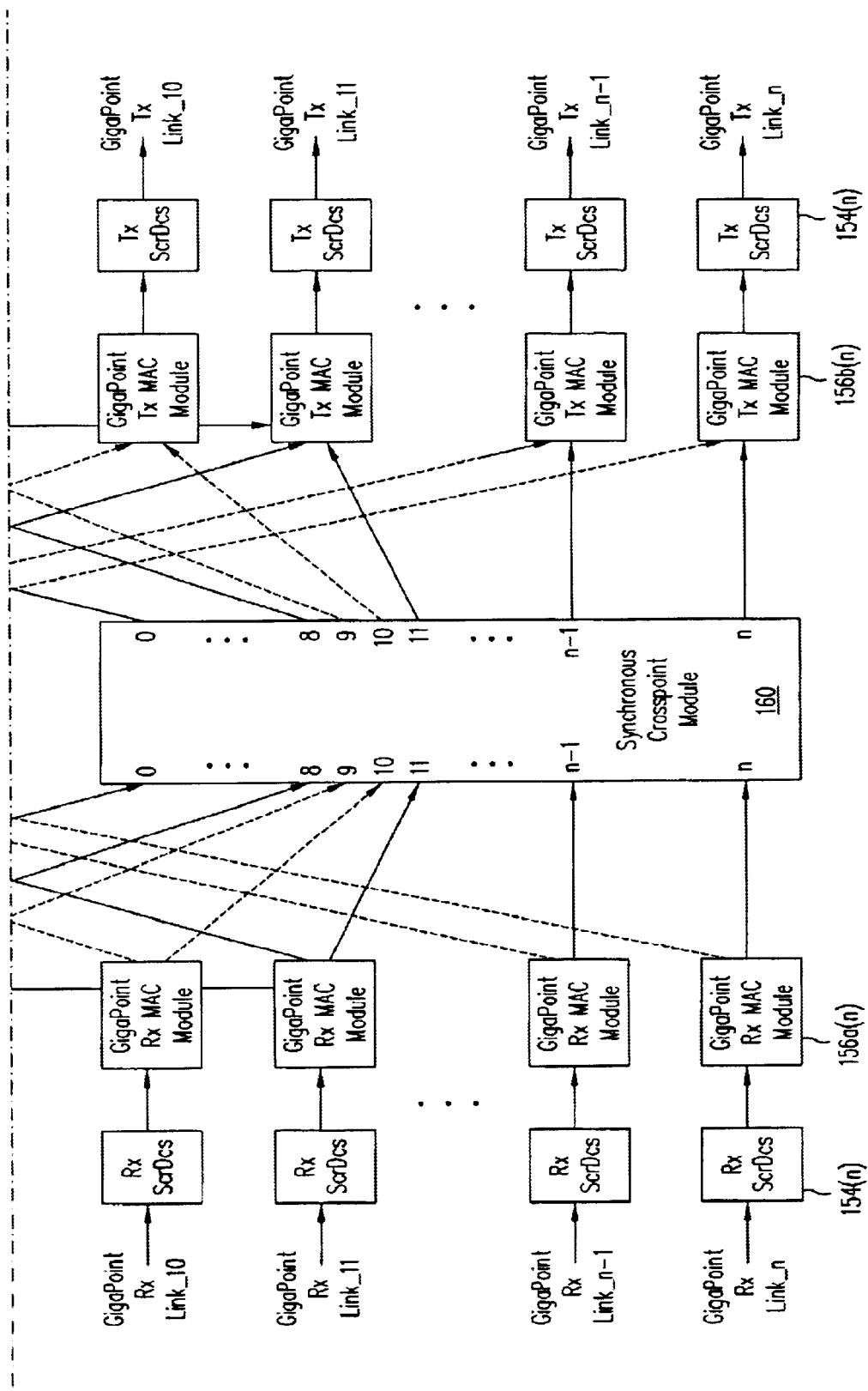
FIG. 10 illustrates a block diagram of a switch unit implementation in an ASIC in accordance with the invention.

A block diagram of the GRX ASIC is depicted in FIG. 10. In the receive path, the GigaPoint Rx MAC modules 156a (1)–a(n) interface with the GigaPoint SerDes receiver 154 (1). The Rx MACs extract packet arrival and backpressure fields from the GigaPoint packet headers and pass the information to the GigaPoint Arbiter 135 and GigaPoint Tx MACs 156a(1)–a(n) respectively. The GigaPoint Rx MAC modules also provide data layer decoding by splitting STS, TDM, multicast packet, and unicast packet traffic. In one embodiment, only unicast packet traffic is routed to the Packet Crosspoint 158 and the other traffic types are routed to the Synchronous Crosspoint 160. Loosely scheduled TDM and multicast traffic could be routed through the packet cross-connect 158, but it is actually more convenient to route these types of packet traffic through the synchronous cross-connect 160 as well. In the transmit path, the GigaPoint Tx MAC 156b(1)–b(n) modules combine the various traffic types output by the crosspoints 158, 160 and output them to the GigaPoint SerDes Transmitters 154(1)–n.

Also, the Tx MACs insert packet grants and backpressure fields into the GigaPoint packet headers. The Packet Crosspoint 158 snoops on the Packet Grant 302 and Packet Arrival 300 interfaces in support of the grant audit mechanism.

For detailed information concerning the implementation details for the synchronous cross-connect 160, refer to cross-referenced U.S. application entitled "Switching of Multiple Classes of Synchronous Data Traffic," by Ying Zheng and the "GRX ASIC Synchronous Crosspoint Module Specification," attached hereto as Attachment D. For more detailed information regarding the asynchronous cross-connect 158, refer to cross-referenced U.S. Application entitled "Receive And Transmit Packet Crosspoint" by James W. Jones and the "GRX ASIC Packet Crosspoint Module Specification," attached hereto as Attachment C.

Figure 11:
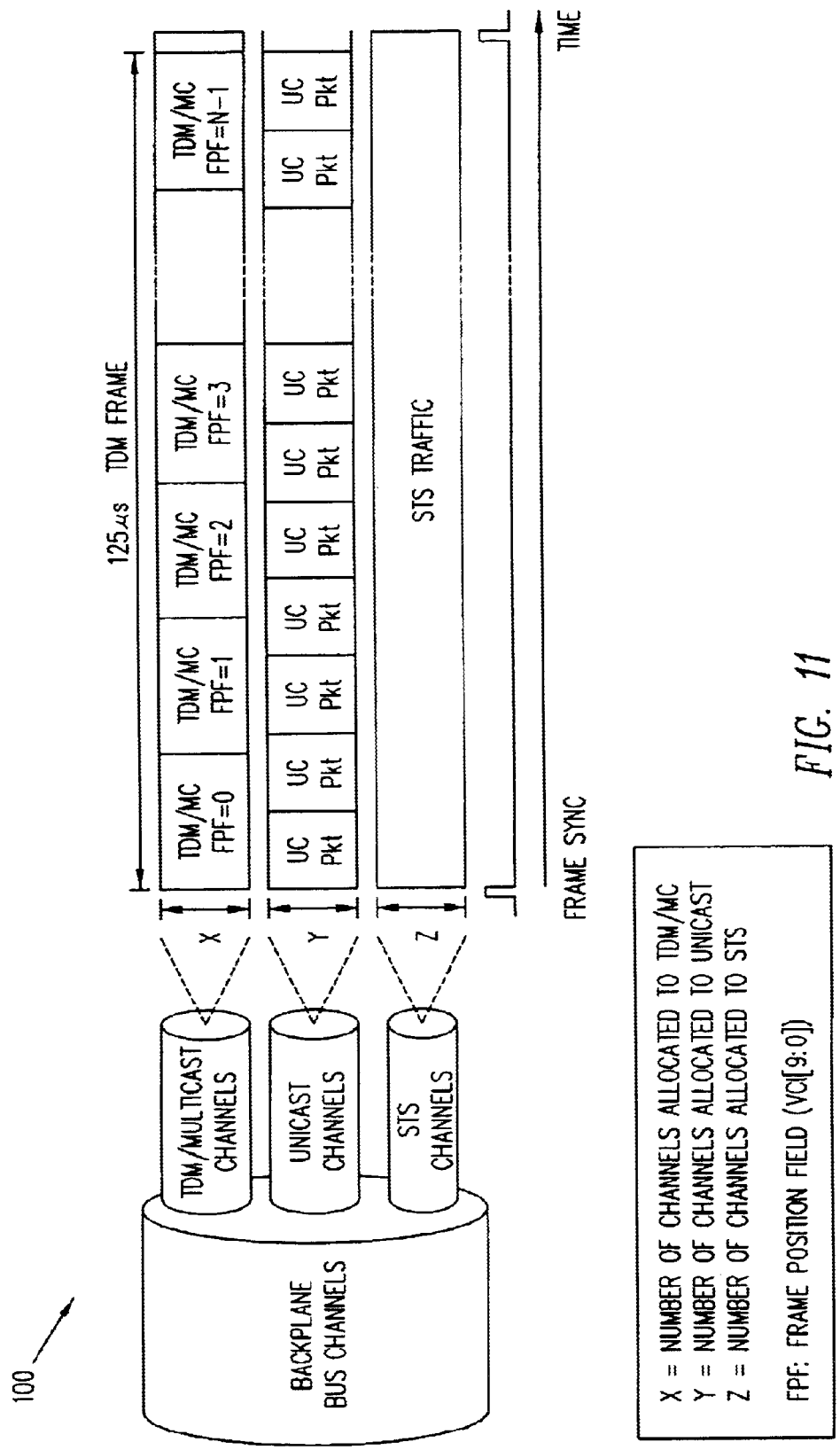
FIG. 11 illustrates classification of traffic carried over serial links into three primary groups in accordance with the invention.

In one embodiment, traffic carried over the serial links between the GAP 140 and the GRX 139 is classified in to three primary groups. As shown in FIG. 11, 60 GigaPoint channels 310 are pre-allocated for STS 312, TDM/Multicast 316, or Unicast traffic 314. Fixed TDM FLP (fixed length packet) slots are then defined within the channels allocated to TDM. Each TDM FLP slots is 64 bytes long and remains at a fixed location with respect to the 125 us frame sync until the TDM pipe is re-sized. TDM traffic shares its bandwidth with Multicast traffic, which means that software needs to take into account the bandwidth requirements of Multicast when provisioning TDM.

Each GigaPoint bus can support the transport of STS traffic in designated timeslots in a 125 us frame window. Traffic in channels sharing the same channel designator can be merged as it is passed through the 24:1 masked muxes. This function allows a VT1.5 cross-connect function to be implemented by aligning VT1.5s within the appropriate STS channel(s).

Typically, 12 channels will be allocated to TDM (Time Division Multiplexing), each channel can carry 810 bytes every 125 us, allowing approximately 150 TDM cells or 3,600 DS0 channels to be transported on the GigaPoint bus. The maximum number of TDM cells per frame is limited to 512 cells, or 12,288 DS0 channels.

Thus, those of skill in the art will recognize that combining and routing both asynchronous and synchronous traffic across a common fabric reduces system imlementation size as well as makes the invention easily configured to handle numerous legacy applications network applications, as well as to combine such applications into one system. Moreover, the flexibility in provisioning bandwidth among the traffic types makes the invention configurable for serving applications from the subsricber edge of a network up to the edge of the core of a network.

In one embodiment, serial links are terminated by the Serdes receiver core, where the data is decoded and has a serial to parallel operation performed. The GP MAC (GigaPoint Media Access Control) module provides further processing, extracting FLP (Fixed Length Packet) arrival information and passing it to the Arbitration Engine 135 (FIG 10). The Rx MAC module also provides GP (GigaPoint) data layer decoding, allowing STS traffic to be handled separately from FLP traffic. The Arbitration Engine 135 controls the incoming flow of traffic to the GRX (GigaPoint Routing Crossconnect) by issuing grants to the line cards, indicating when data can be sent to the GRX. Grants are issued such that no contention occurs in the Cross-point while at the same time maximizing the throughput of the Cross-point. Egress traffic exits the Cross-point and passes through the CP Tx MAC modules, where grant information is inserted into the FLP overhead for use on the line cards. The SerDes transmit core provides a parallel to serial conversion as well as any physical layer functionality.

A GigaPoint interface is formatted to allow the transport of five different traffic types in fixed priority. They are:

| Priority | Transport Type | Channel Type | Traffic Type |
|---|---|---|---|
| 1 | Channelized | Any | GigaPoint Overhead |
| 2 | Channelized | STS | STS channels |
| 3 | Sync packet | Sync | TDM packets |
| 4 | Sync packet | Sync | Multicast packets |
| 5 | Async packet | Async | Unicast packets |

Figure 13:
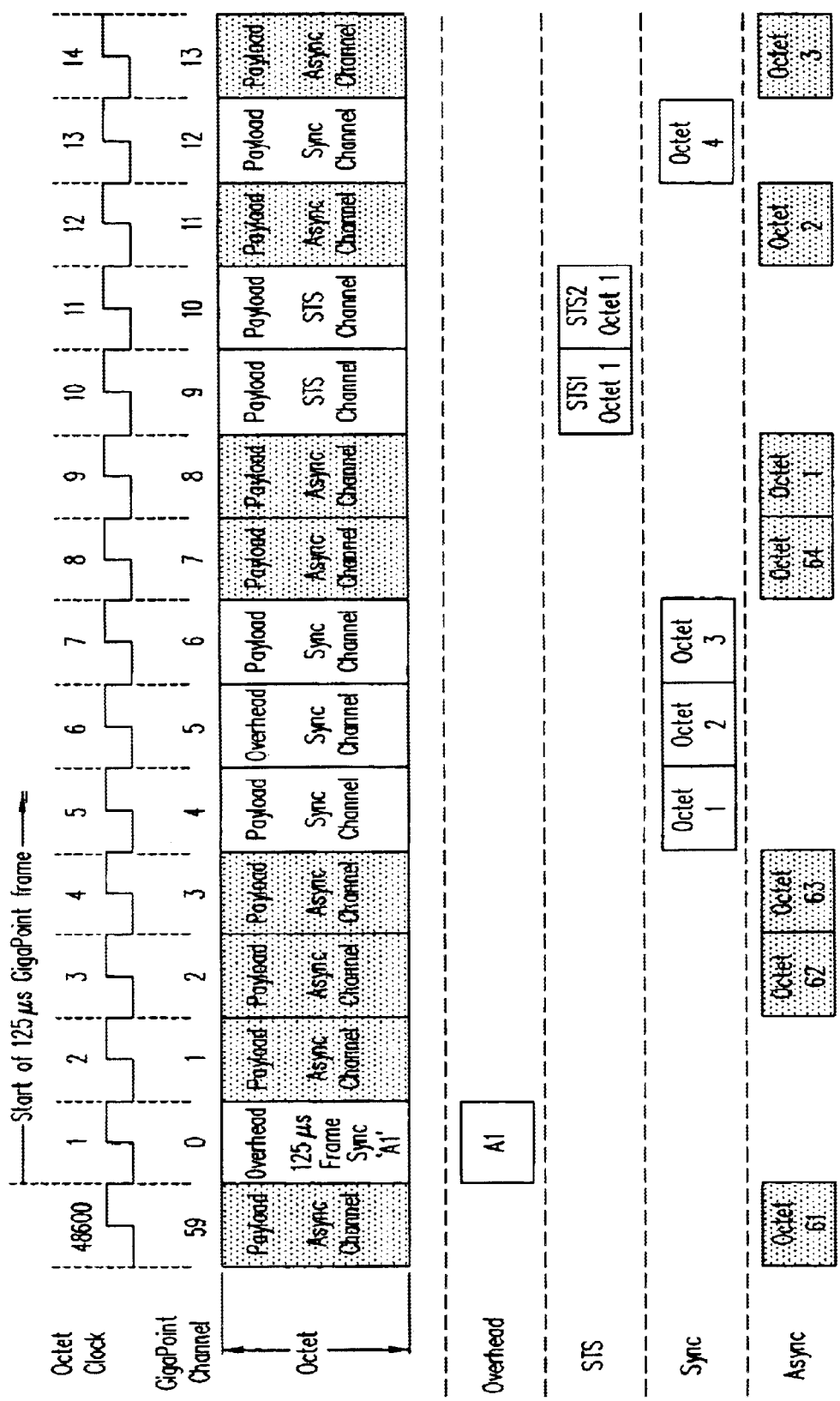
FIG. 13 illustrates synchronous and asynchronous packets being byte interleaved on a bus to which the MAC of FIG. 12 is connected.

Overhead timeslots in the overhead carry the highest priority. Overhead timeslots are fixed in position in hardware. The remaining bandwidth in the overhead channel may be provisioned for use by STS, synchronous or asynchronous traffic. STS channels are provisioned by software, but once provisioned, these timeslots may not be used for transport of any traffic other than STS. Synchronous packets are transported in timeslots assigned to fixed positions within the GigaPoint frame. Synchronous and Asynchronous packets may be byte interleaved as illustrated in FIG. 13. Asynchronous packets are transported primarily over asynchronous channels. Asynchronous packets may be use synchronous channel timeslots when synchronous traffic is not present. Asynchronous packets have no fixed start and stop position relative to the GigaPoint frame. However, the first octet of an asynchronous packet always occupies the first available asynchronous timeslot subsequent to the 6 ms GigaPoint superframe.

GigaPoint data is scrambled based on the SONET scrambling format as defined in GR-253-CORE. All data excluding the A1 and A2 framing bytes in the overhead channel, is scrambled at the GigaPoint transmit MAC and de-scrambled at the corresponding GigaPoint receive MAC. The scrambling function maintains bit transition density which permits circuitry within the GAP and GRX ASICS to efficiently extract clock and data from the GigaPoint bus. The GigaPoint operates at a serial bit rate of 3.110Gbps. At this rate, the GigaPoint has a data capacity of exactly 25% greater than STS-48, or the equivalent of STS-60. Over a 125 us SONET frame, sixty byte-interleaved GigaPoint channels (GP Channels) are designated. Each GP Channel transports 810 bytes every 125 us frame.

These sixty GP Channels are independently configurable for STS, synchronous packet or asynchronous packet transport and are defined as STS channels, Sync channels or Async channel respectively. GigaPoint overhead consumes scyen bytes of bandwidth each 125 us frame. Overhead timeslots are transported within the first dedicated packet GigaPoint channel, the overhead channel. As with the other fifty-nine channels, the overhead channel can be provisioned as an STS. Sync or Async channel. GigaPoint FLPs are in fixed positions, or packet slots, relative to the GigaPoint frame and number of active STS channels. The utilization of active STS channels determines the maximum packet capacity. The table below displays packet capacity per GigaPoint frame.

| Active STS channels | GigaPoint FLPs per frame | Packet Data Rate (payload only) |
|---|---|---|
| 0 | 758 packets | 2.33 Gbps |
| 3 | 720 packets | 2.21 Gbps |
| 12 | 607 packets | 1.86 Gbps |
| 24 | 455 packets | 1.40 Gbps |
| 48 | 151 packets | 0.46 Gbps |

The GigaPoint (serial) bus is based on a 6 ms GigaPoint Frame. The GigaPoint Frame contains 5 types of Timeslots as shown in figure: 6 ms Frame Sync. STS-1 Channel, Packet Timeslot, ATM time slot and a overhead timeslot. Every other timeslot can be configured to transport STS-1, ATM or Packet traffic. The GigaPoint DMA controller has a map of which timeslots has been allocated for STS-1 traffic or packet transport. A timeslot can be configured by software without corruption of traffic in other timeslots. The configuration is held in a 3 bit wide dual port memory with a number of entries.

| Gigapoint Data Types | |
|---|---|
| Configuration | Traffic type |
| 00 | Idle not used |
| 01 | STS-1 traffic |
| 02 | ATM traffic |
| 03 | Packet traffic |
| 4 . . . 7 | reserved |

STS-1 traffic received is directed to the TDM M-Port arbiter, packet traffic is directed to the packet M-Port arbiter, 6 ms Frame sync is directed to the Clock & synchronization block and overhead information is directed to the overhead processor. Idle traffic is discarded. STS-1 traffic, packets and overhead information is merge into the 6 ms GigaPoint Frame from the appropriate blocks. To verify the integrity of the back plane a PRBS (Pseudo Random Bit Sequence) sequence is transported over the idle timeslots. If a PRBS errors is detected an alarm will be raised. If excessive PRBS errors are encounters an excessive prbs alarm with be raised and software will either fail the LU or perform a protection switch.

The GAP ASIC of some embodiments contains an ARM9TDMI (or comparable) core and supporting subsystem. The ARM Core hosts an operating system and manages most board level functions as well as system communications. The ARM Core accesses supporting peripherals as well as an on-chip bus bridge function via the ARM local bus (AMBA bus). Line units and the duplex RAP common control pair have a common CPU and memory arrangement. The CPU, common peripherals and memory are integrated silicon FLPs contained in the GAP ASIC. The elements contained in and supporting the ARM are as follows:

ARM9TMDI CPU, 32 bit RISC, full mode @ 200Mhz. Provides 220 MIPS

A pair of UART interfaces

An interrupt controller

Periodic kernel timer

2 Megabytes of SDRAM (off ASIC)

Processor bus extension (to off ASIC devices)

JTAG Port for debug purposes

Watchdog Timer

FLP based communications datalink

In addition to the above, all line units use FLASH memory to contain the bootstrap code and the flash based file system. The currently identified FLASH memory device is an AMD29DL322C part. This device provides 8 Megabytes of FLASH memory providing 128 64Kbyte sectors. Note that the above is common to all boards that contain a GAP ASIC. For specific applications, the processor bus extension may be connected to external devices unique to a particular application. For example, on a T1 Line Unit, the external bus could be connected up to a T1 framing chip.

A queue manager controls the storing and retrieval of FLPs (Fixed Length Packets). To avoid Head of line blocking the GAP utilizes virtual output queuing. By assigning queues for each possible output port a packet destined for one port (but not available) will not block packets for other ports. Each port support 16 classes of services hence each port will have 16 queues associated with it to. The following table shows the number of queues required for each interface:

| Interface Queues | | |
|---|---|---|
| Interface | Number of ports | Number of queues |
| GigaPoint Bus | 32 | 512 |
| Utopia level 2 | 31 | 496 |
| SAR | 1 | 16 |
| Total | 64 | 1024 |

Linked list queuing is used to effectively use the memory resources. The controls structure of a queue is outlined in the following table:

| Queue Control Structure | | |
|---|---|---|
| Field | Width (bits) | Description |
| Head | | Pointer to the first FLP/packet in the queue |
| Tail | | Pointer to the end/last FLP in a queue |
| MaxLength | | The maximum number of packets chunks that can be stored in a queue |
| QueueType | 2 | ATM (fixed length) or IP Packets |
| EPD | 1 | Enable Early Packet discard |
| PPD | 1 | Enable Partial Packet discard |
| Size | | Number of packet chunks in a queue |
| PacketCount | | Number of packet stored in a queue |
| DiscardedPC | | Number of discarded packet chunks |
| DiscardedPackets | | Number of discarded packets |
| OverflowIndication | | |

The queue receive interface store FLPs/packets received from the GigaPoint Bus Interface, Utopia interface and the SAR. The packets can be of either fixed length (ATM) or variable lengths. Variable lengths packet can be preempt hence the QRI keep track of the last packet chunk stored in the memory when reception of chunk resumes.

The Packets received on the GigaPoint Bus are forwarded to the GigaPoint Packet receive interface. The GigaPoint Packet Envelope is terminated. Transmit grant information is forwarded to the GigaPoint Packet Tx-interface. Based upon the QoS and the routing the packet is stored in it's appropriate queue. When a packet is stored in the queue the packet/chunk let counter is incremented. If the queue is full an overflow event is set and the packet/chunk is discarded. Since transmission of a packet can be pre-empt the queue manager has a stack to keep track of the status of the queue when it is pre-empt. The following describes the information pushed on the stack when a packet is pre-empt: Pointer to where the last chunk was written to the queue, Pointer to the control structure of the queue (mote-pretty much you just have to push the state of the queue write state machine).

The GigaPoint packet Tx interface maps packets into the transmit GigaPoint Bus, Every xx timeframe a packet containing the status of the GigaPoint Bus queues will be transmitted to the GRX. This information is used by the GRX to decide which queue should be granted access to the GigaPoint Bus. When a queue has been granted access the GAP transmits the packet. Preemption of packets is done in a similar fashion as done in the Rx interface.

Serial links are terminated on the GRX 139 in the TI (Texas Instruments) supplied SerDes macros. The SerDes (Gigabit Ethernet Serializer-Deserializers) provide clock recovery and serial to parallel conversion. The parallel data is passed on to the custom designed GP MAC logic where framing is provided based on the A1 and A2 GP bytes. Once framing has been established, the RX MAC module (FIG. 10) begins directing packet traffic to the Asynchronous Crosspoint 158 and TDM, STS (SONET Traffic Stream) and multicast traffic to the Synchronous Crosspoint 160 for further processing.

The Asynchronous Crosspoint 158 provides cross connect functionality for ATM (Asynchronous Transfer Mode) traffic. The Asynchronous Crosspoint 158 provides input and output FIFOs for each of the 24 supported ports. The Asynchronous Crosspoint Arbitration Engine 135 has previously arbitrated ATM traffic arriving at the inputs and the Asynchronous Crosspoint 158 provides a final level of arbitration connecting input FIFOs to output FIFOs in an opportunistic fashion.

The Asynchronous Crosspoint Arbitration Engine 135 controls the incoming flow of traffic to the GRX by issuing grants to the line cards, indicating when data can be sent to the GRX. The Asynchronous Crosspoint Arbitration Engine 135 maintains an image of the VOQ (Virtual Output Queue) structures on the GAPs (GigaPoint Access Processor—line unit GigaPoint interface) based on Cell Arrival information carried in the cell header fields of ingress traffic. Grants are issued based on cell occupancy in the VOQ, Class of Service as well as output availability.

The Synchronous Crosspoint 160 provides cross connect functionality for STS, TDM and multicast Traffic. Traffic bound for this Crosspoint 160 must be mapped in a synchronous fashion allowing minimal latency flow through the Crosspoint 160.

TDM traffic is passed in the form of ATM cells through the Sync Crosspoint 160. This traffic differs from regular ATM traffic because it needs to the have a merge function performed as it passes through the Crosspoint. Essentially, TDM cells from various input GigaPorts have a logical OR function performed if they are passing through the Sync Crosspoint 160 and are destined for the same output GigaPort. In order to achieve this, the incoming cells to be merged must be synchronized relative to the GigaPoint frame across all input GigaPorts.

Multicast traffic makes use of the synchronous nature of the Sync Crosspoint 160 to guarantee that all leaf outputs for some given multicast connection are free (not connecting any TDM cells) when the cell arrives at the Sync Crosspoint 160. Egress traffic exits the Crosspoints 158 and 160 and passes through the GP Tx MAC modules, where grant information is inserted into the cell overhead for use on the line cards. The custom GP Tx MAC logic provides SONET framing for the GP link and forwards the parallel data stream to the SerDes Tx macro. The SerDes provides a parallel to serial conversion and drives the data out the device.

Figure 14:
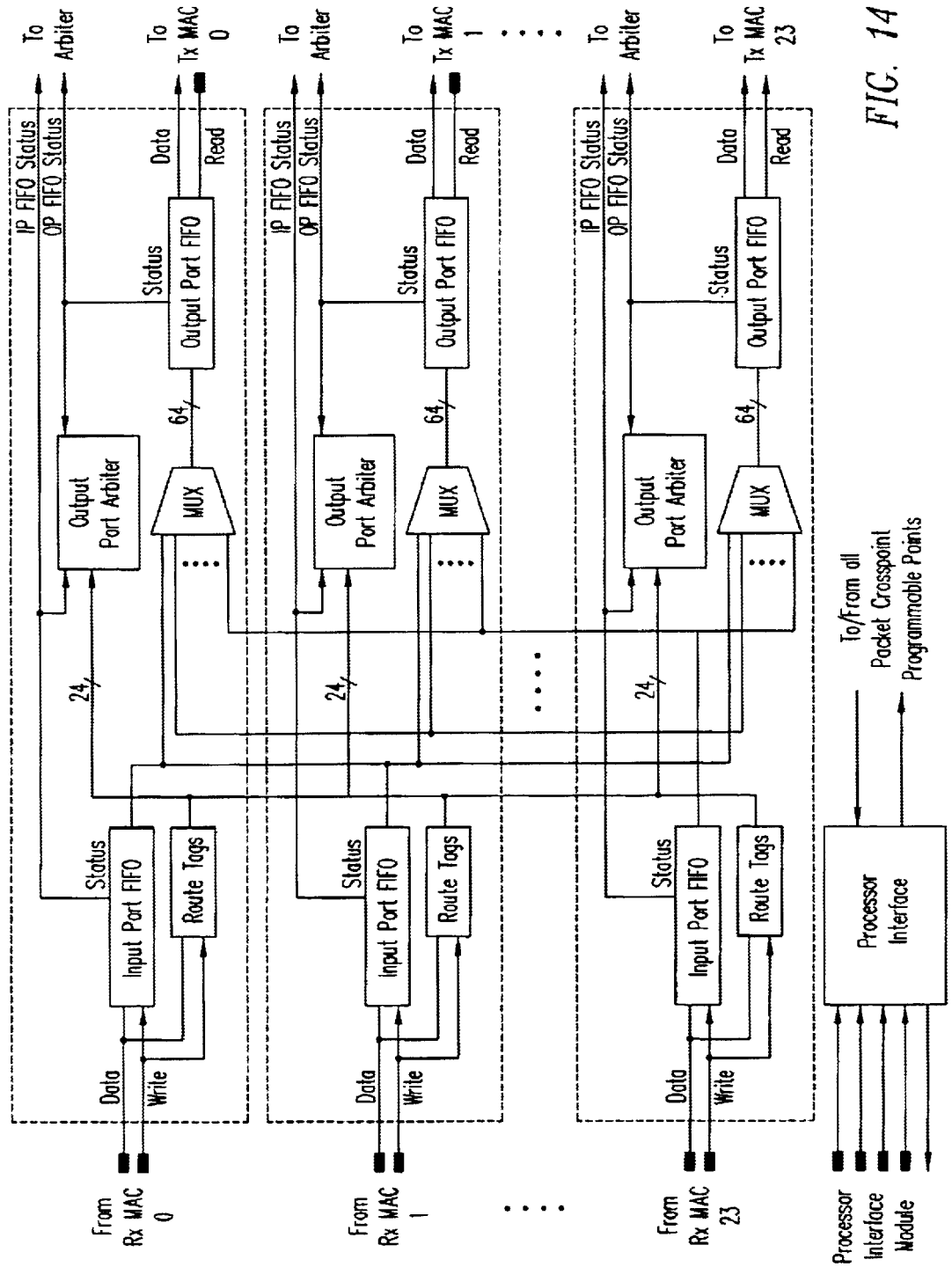
FIG. 14 illustrates an asynchronous crosspoint arbitration engine in one embodiment.

FIG. 14 shows one embodiment of Asynchronous Crosspoint 158. The Asynchronous Crosspoint 158 uses 24 to 1 muxes to provide connectivity between the 24 inputs and outputs. The Asynchronous Crosspoint Arbitration Engine provides a first round of arbitration based on available inputs and outputs. The granted traffic is sent to the GRX and enqueued in input FIFOs where they await their turn to be cross connected under the Output Port Arbiter's control. The Output Port Arbiter services the input FIFOs in a round robin fashion.

Figure 15:
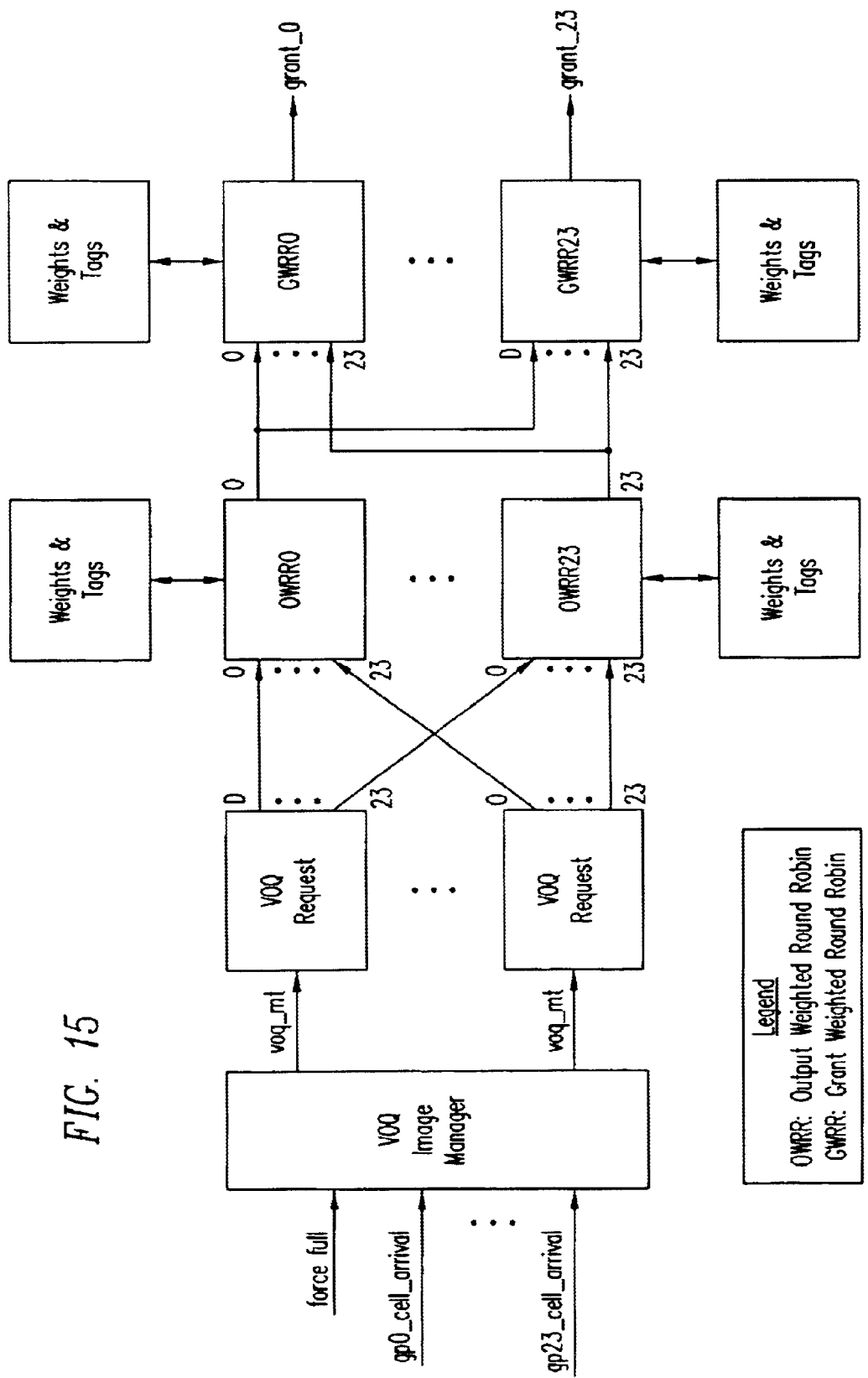
FIG. 15 illustrates one embodiment of the arbitration engine.

FIG. 15 shows one embodiment of the Arbitration Engine 135 in block diagram form. An arbitration sub-module exists for each of the 24 GigaPorts on the GRX. Cells arriving on the GAP device associated with a given GigaPort are indicated to the GRX via header fields prepended to ingress cells. This cell arrival information is extracted by the GigaPoint Rx MAC module and transferred to the VOQ Image Manager module in the Arbiter module.

The Arbitration Engine 135 uses a 3 phase arbitration algorithm to determine the best cross connect matching of inputs and outputs based on port availability. The Arbitration Engine 135 sends the winning Q information to the respective GigaPoint Tx MAC modules which in turn generate grant messages destined for the appropriate GAPs.

Figure 16:
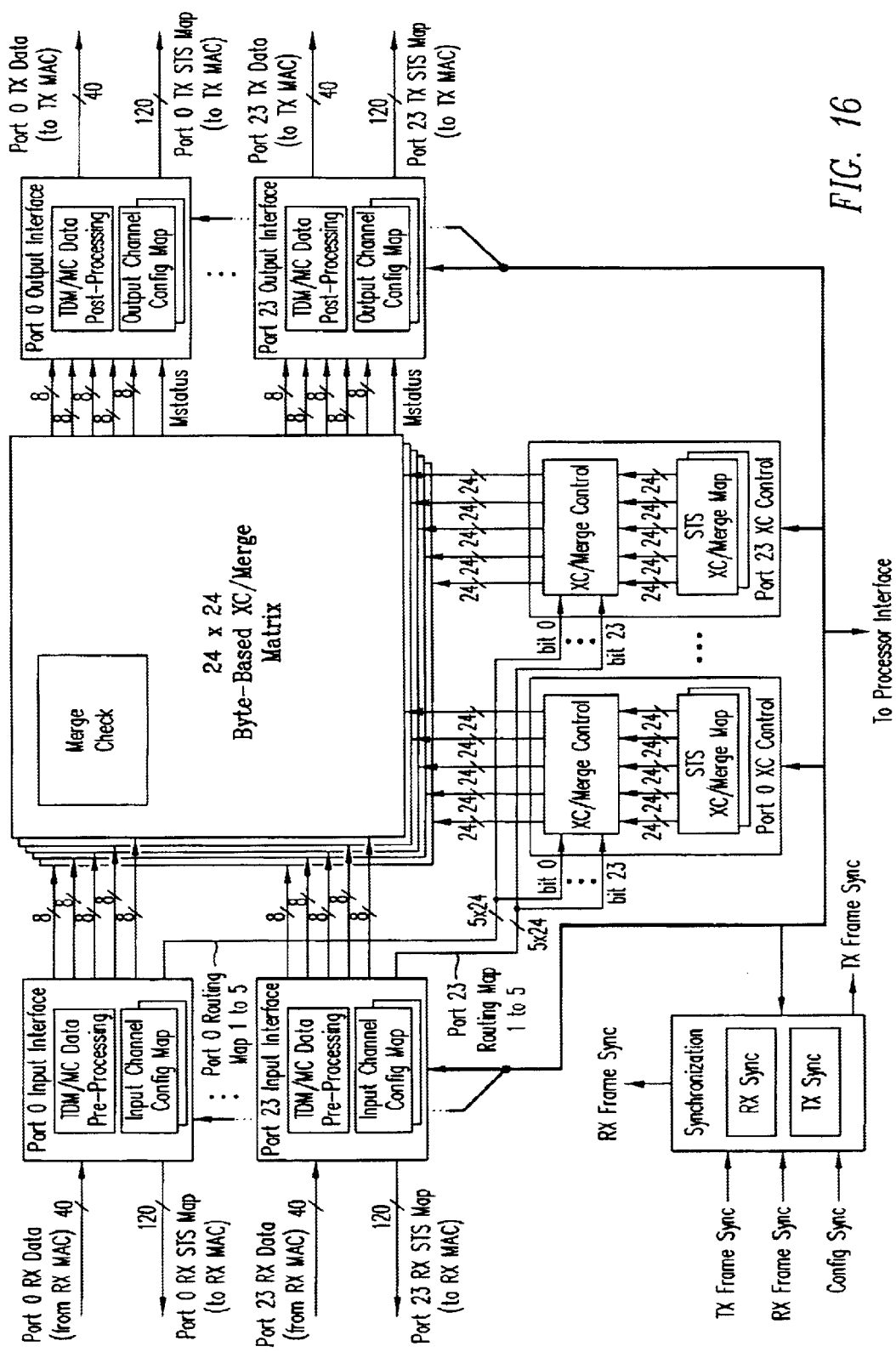
FIG. 16 shows the synchronous crosspoint structure of one embodiment.

FIG. 16 shows the Synchronous Crosspoint structure. The Synchronous Crosspoint uses 24 to 1 muxes to provide connectivity between the 24 inputs and outputs. Muxes are controlled by a centralized mux/merge control function. The muxes can be configured to enable any combination of inputs simultaneously resulting in the ORing (merging) of the inputs.

Numerous modifications and adaptations of the embodiments described herein will be apparent to the skilled artisan in view of the disclosure.

In one embodiment, the GigaPoint interface supports transport of up to 60 STS-1 channels. Each channel is assigned 810 timeslots within a 125 us GigaPoint frame. These timeslots are fixed in position relative to the GigaPoint frame. Channels are configurable on a per STS-1 basis at the line unit and RAP. When STS channels are not allocated for STS-1 transport, they revert to packet traffic. When STS-1 traffic occupies the maximum of 48 channels, twelve remaining channels transport overhead and packet traffic. STS payload may be transported locked or floating. In locked or floating mode, the line unit's STS interface aligns the SONET transport overhead to the GigaPoint frame. Locked payload STS traffic aligns both the SONET TOH and SPE to the GigaPoint frame. A fixed value in the TOH H1, H2 and H3 payload pointers of '00' positions the path overhead directly after the transport overhead on every frame. Floating traffic is transported GigaPoint-aligned SONET transport overhead and floating SPE (path overhead and payload). As with standard SONET interfaces, the frame position of the SPE is determined by the offset value of payload pointers H1, H2 and H3.

Unicast packet traffic, async packets, are transported in fixed packet slots, but is not aligned to each 125 us frame sync. Async packets are aligned to 6 ms superframe sync. Unicast async packets are transported in Async GP (GigaPoint) Channels and may also occupy timeslots within Sync GP Channels when sync packets are not present. Unicast traffic is transported through the GRX's packet cross-point. Unicast traffic carries the lowest priority through the GRX.

Overhead timeslots are fixed in position in hardware. The remaining bandwidth in the overhead channel may be provisioned for use by STS, synchronous or asynchronous traffic. STS channels are provisioned by software, but once provisioned, these timeslots may not be used for transport of any traffic other than STS. Synchronous packets are transported in timeslots assigned to fixed positions within the GigaPoint frame. Synchronous and Asynchronous packets may be byte interleaved. Asynchronous packets are transported primarily over asynchronous channels. Asynchronous packets may use synchronous channel timeslots when synchronous traffic is not present. Asynchronous packets have no fixed start and stop position relative to the GigaPoint frame. However, the first octet of an asynchronous packet always occupies the first available asynchronous timeslot subsequent to the 6 ms GigaPoint superframe. The first available asynchronous timeslot may be a timeslot provisioned for asynchronous traffic, or an available timeslot in an idle synchronous packet slot. While sync and async packets have different packet type values, they are delineated by the GigaPoint receiver logic by their relative positions to frame and superframe sync and a GigaPoint channel map configuration which must match at GigaPoint source and destination.

Each packet slot within a frame is made up of a 16-byte GigaPoint header (including ATM header) and a 48-byte payload. The GigaPoint head includes the following components:

Packet type field

Packet class of service field

Packet length field

Extension field for context bits

Backpressure state bits

Upstream packet arrival/Downstream packet grant field

Facility identifier bits

Plane identifier bits

Routing map field

Flow identifier field

Header (VPI, VCI, PTI, CLP)

Header error check byte

GigaPoint headers are generated for each packet slot. A header error check byte is transported within each header, generated from the previous 120 header bits. The GigaPoint header is illustrated in 32-bit format in FIG. 17. GigaPoint Header Bit Definitions are as follows.

Word 0

Bits 31–28 Packet Type field. The packet type field identifies data within a packet slot for routing within the GRX and GAP ASICs. The packet type is encoded as follows:

| Bit 31 | Bit 30 | Bit 29 | Bit 28 | Packet Type |
|---|---|---|---|---|
| 0 | 0 | 0 | 0 | Idle |
| 0 | 0 | 0 | 1 | Unicast |
| 0 | 0 | 1 | 0 | Not defined |
| 0 | 0 | 1 | 1 | Not defined |

-continued

| Bit 31 | Bit 30 | Bit 29 | Bit 28 | Packet Type |
|---|---|---|---|---|
| 0 | 1 | 0 | 0 | Not defined |
| 0 | 1 | 0 | 1 | Not defined |
| 0 | 1 | 1 | 0 | Not defined |
| 0 | 1 | 1 | 1 | Not defined |
| 1 | 0 | 0 | 0 | Host SOM - Start of message |
| 1 | 0 | 0 | 1 | Host COM - Continuation of message |
| 1 | 0 | 1 | 0 | Host EOM - End of message |
| 1 | 0 | 1 | 1 | Host SSM - Single segment message |
| 1 | 1 | 0 | 0 | TOH - Transport Overhead |
| 1 | 1 | 0 | 1 | Multicast |
| 1 | 1 | 1 | 0 | TDM strict schedule |
| 1 | 1 | 1 | 1 | TDM loose schedule |

NOTE: All traffic types other than Grant-free HOT packets (type '0010') will decrement the Release 1 GPX packet crosspoint's grant counter. Grant-free packets with packet types other than '0010' will cause VOQ accounting errors at the Release 1 GRX packet crosspoint.

Bits 27–24 Packet class of service field. Identifies up to 16 levels of class of service for the current packet.

Bits 23–18 Packet length field. Identifies the length of valid payload within the current packet. SAR EQM and SAR SSM packets make use of this field to identify the end of multi-packet PDUs. A length of '0' in a SAR SOM or COM packet indicates packet abort.

Bit 17 Async multicast bit. This bit in conjunction with packet type and routing map (Rmap) bits 23:22 identifies async multicast packets and their Crossconnect destinations at defined in below.

Async Multicast bit function

| Ingress Source | Packet Type | Packet Header Fields | Traffic Type |
|---|---|---|---|
| UTOPIA | Unicast | AM bit = 0<br>RMap[23] = 0<br>RMAP[22] = 0 | Async Unicast |
| UTOPIA | Unicast | AM bit = 1<br>RMap[23] = 0<br>RMAP[22] = 0 | Async Bridged |
| UTOPIA | Unicast | AM bit = 1<br>RMap[23] = 0<br>RMAP[22] = 1 | Async Multicast Gateway |
| UTOPIA | TDM strict schedule/<br>TDM loose schedule | AM bit = 1<br>RMap[23] = 1<br>RMAP[22] = 0 | Async TDM Gateway |
| SAR | Host SOM/COM/EOM/SSM | AM bit = 0<br>RMap[23] = 0 | Async Management |
| SAR | TOH | AM bit = 0<br>RMap[23] = 0 | Async Management |

Bits 16–15 Context extension bits. These bit locations are reserved for future context information.

Bit 14 Async loopback bit. Used by Release 1 GAP and GRX ASICs only. Release 1 GRX TX MAC drives ALOOP to a '0', Release 1 GAP RX MAX loops ALOOP to the TX MAC.

Bit 13 BP bit. The backpressure bit identifies a congested state at the remote GigaPoint's receive interface. At the GRX, an active BP bit indicates a full, or near full queue condition at the downstream line unit. At the line unit, an active BP bit indicates a full, or near full condition at the GRX's upstream receive queue.

0=No congestion

1=Congestion, backpressure active.

Bit 12 Grant BP bit. Upstream GigaPoint only. The grant backpressure bit identifies a congested state at the GAP's packet grant FIFO.

0=grants enabled

1=GAP grant FIFO full, grants disabled

Upstream Bits 11-0

Packet Arrival field. The packet arrival field reports the arrival of packets at the line unit to the GRX's VOQ image function within the GigaPoint arbiter. The packet arrival word appears at the GRX receive and GAP transmit interfaces. The packet arrival field includes valid, class of service, message type and VOQ identifier information as follows:

| 11 | 10 | 9 | 8 | 7 | 6 | 5 | 4 | 3 | 2 | 1 | 0 |
|---|---|---|---|---|---|---|---|---|---|---|---|
| VALID | COS3 | COS2 | COS1 | COS0 | TYPE1 | TYPE0 | VOQ4 | VOQ3 | VOQ2 | VOQ1 | VOQ0 |

VALID Valid packet arrival bit.

0=No packet arrival

1=Valid packet arrival

COS3-0 Arrival class of service bits. These bit define the class of service of the packet arriving at the line unit's VOQ.

TYPE1-0 Arrival type bits. The type bits transport arrival state as described below:

| Type 1 | Type 0 | |
|---|---|---|
| 0 | 0 | Normal packet arrival. The VOQ identifier indicates which queue has received a packet. |
| 0 | 1 | Initiate VOQ Audit |
| 1 | 0 | Flush. The VOQ identifier indicates which VOQ count should be cleared. |
| 1 | 1 | Terminate Grant Audit |

VOQ4-0 VOQ identifier bits. When the valid bit is active, this field indicates in which VOQ, based on output port, the arriving packet will be stored at the line unit.

Downstream Bits 11-0

Packet Grant field. The packet grant field is sourced by the GRX's GigaPoint arbiter. It identifies which packet should be driven over the upstream GigaPoint to the GRX based on the grant VOQ ID. The packet grant word appears at the GRX transmit and GAP receive interfaces. Because the GAP ASIC at the line unit caches grants, the next upstream packet may be not be the last packet granted.

| 11 | 10 | 9 | 8 | 7 | 6 | 5 | 4 | 3 | 2 | 1 | 0 |
|---|---|---|---|---|---|---|---|---|---|---|---|
| VALID | COS3 | COS2 | COS1 | COS0 | TYPE1 | TYPE0 | VOQ4 | VOQ3 | VOQ2 | VOQ1 | VOQ0 |

VALID Valid packet grant bit.
 0=No packet grant
 1=Valid packet grant
COS3-0 Grant class of service bits. These bits define the class of service of the packet arriving at the line unit's VOQ.
TYPE1-O Grant type bits. The type bits transport grant state as described below:

| Type 1 | Type 0 | |
|---|---|---|
| 0 | 0 | Normal packet grant. The VOQ identifier indicates which queue is granted. |
| 0 | 1 | Terminate VOQ Audit. Initiate Grant Audit |
| 1 | 0 | Flush. The VOQ identifier indicates which VOQ count should be cleared.* |
| 1 | 1 | Terminate Grant Audit** |

*The flush audit type is filtered at the GRX TX MAC.
**The grant audit code is filtered at the GAP ASIC VOO4-0 VOQ identifier bits. When the valid bit is active, this field indicates which line unit VOQ is granted access to the upstream GigaPoint.
Word 1
Bits 31–30 Facility ID extension field. For future use, this field extends the GigaPoint facility ID to accommodate up to 64 ports.
Bits 29–26 Facility ID field. These bits identify the destination facility for this packet at the target line unit.
Bits 25–24 Plane ID bits. This field is reserved for future use by GRX/GAP ASICs capable of supporting four GigaPoint interface per line unit slot. The future GRX fabric may be partitioned into four each 24-port switching fabric planes. This field allows future GAPs to specify which switching plane a packet is destined for.
Bits 23-0 Routing map field. The routing map indicates which output port this packet is to be routed to at the GRX. The routing map serves no purpose in the downstream GigaPoint path. Unicast traffic sets one of the twenty-two bits. Multicast traffic may set up to twenty-two bits active. Bit 0 corresponds to GigaPoint port 0, bit 21 to port 21, etc.
 0=Do not route to corresponding port.
 1=Route to corresponding GRX GigaPoint output port.
Word 2
Bits 31-28 Flow ID extension field. The flow identifier extension field carries routing information in addition to the 16-bit flow ID generated at the line unit's packet processor. Full use of the flow ID and flow ID extension accommodates up to 1 million flows. The GRX passes the flow ID extension field and does not process its contents.
Bits 27-12 Flow ID field. This flow identifier field is used by line units within the C7 shelf to identify individual flows at the packet processor. The GRX passes the flow ID field and does not process its contents.
Bits 11-0 Virtual port identifier bits 11-0.
Word 3
Bits 31-16 Vitural connection identifier 15-0.
Bits 15-3 Payload type identifier bits 2-0.
Bit 12 Loss plan bit.
Bits 11-8 Reserved for future use.
Bits 7-0 HEC. Header error check byte for all four 32-bit words of the GigaPoint header. The HEC byte is derived from an $x^8+x^2+x+1$ coset polynomial capable of detecting single and multi-bit errors.

The GigaPoint Rx MAC Module associated with a Packet Crosspoint input FIFO writes 64 bit words into the FIFO as complete words become available. After a complete 64 byte packet has been written to the FIFO, the routing bit relevant to an output port (one from each input port) is presented to the output port's Arbiter submodule. At the beginning of each arbitration cycle, an Arbiter chooses a winning input to transfer to its output FIFO. The arbitration algorithm is a simple round-robin algorithm. The arbitration cycles for the different outputs are not synchronized to each other.

After an entire packet has been transferred to an output FIFO, the associated GigaPoint Tx MAC is signaled by asserting a packet available signal. The Tx MAC can then read the output FIFO as needed in 64 bit word increments to interleave the packet words with the other traffic output from the Synchronous Crosspoint.

Figure 18:
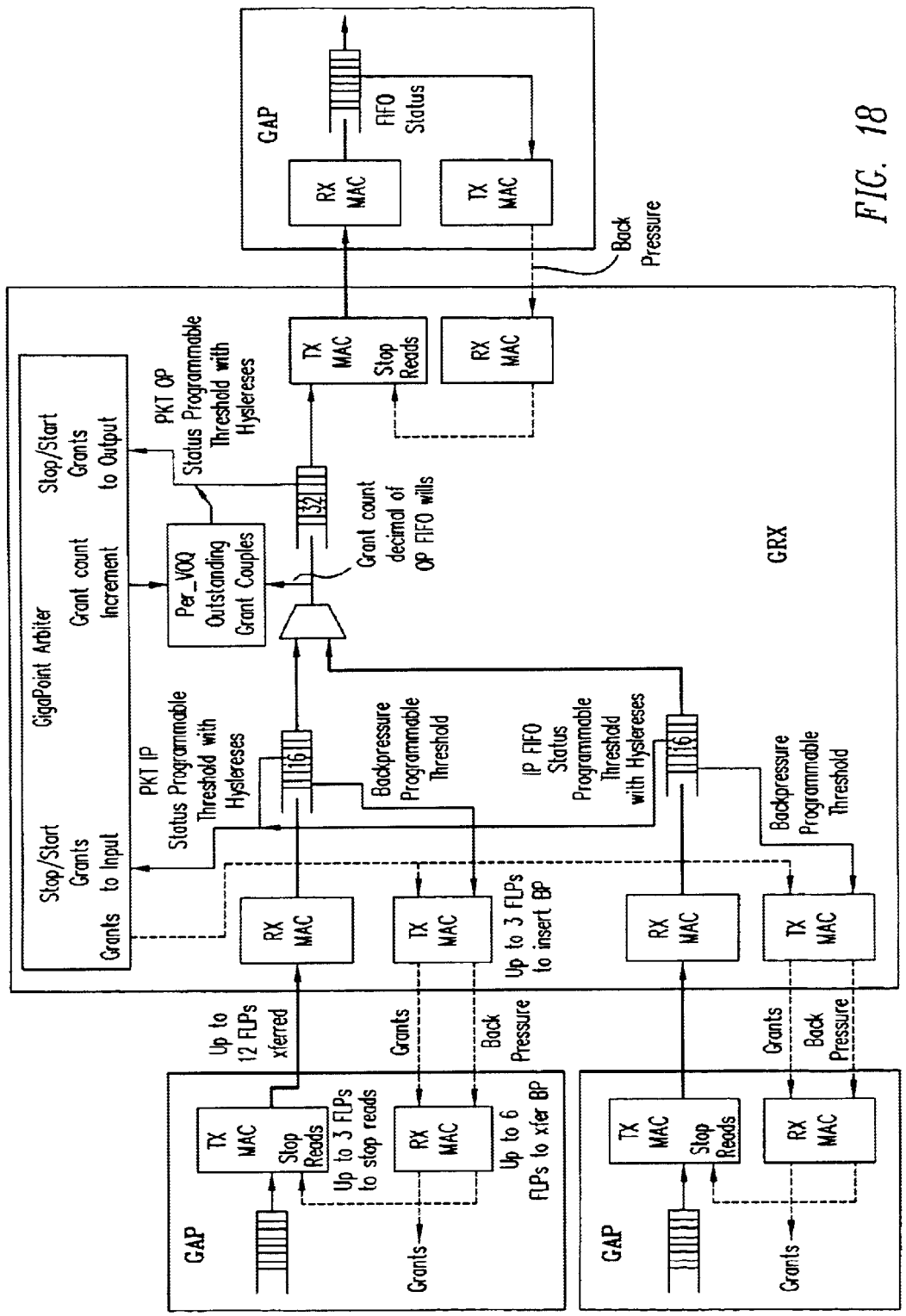
FIG. 18 depicts a system implemented between a GRX and GAP ASICs to control the flow of unicast packets in one embodiment.

FIG. 18 depicts the system implemented between the GRX and GAP ASICs to control the flow of unicast packets. The following points describe the functions of the Packet Crosspoint that support the flow control mechanism for unicast packets.

The PKT OP Status signal provided to the GP Arbiter is asserted if either the OP FIFO threshold or the Grant Counter Threshold is crossed. The OP FIFO threshold component of the feedback to the GigaPoint Arbiter provides a means for the Arbiter to match the rate of grants output by the Arbiter to the bandwidth available to the output of the Packet Crosspoint. The Grant counter components of the feedback to the GigaPoint Arbiter assures that there are no more outstanding packets in the system destined to the output than can be held in the output FIFO. This prevents congestion at the output from affecting any input FIFOs, and therefore eliminates potential head of line blocking in the input FIFOs in the case where all packets are granted. Grant-free packets operate outside of the grant counter threshold mechanism. The GigaPoint Arbiter stops issuing grants to all packets destined for an output FIFO when the status signal for that output is asserted. The level at which the OP FIFO status signal is asserted or negated when filling or draining respectively is programmable in increments of one packet by writing to the "Output FIFO Threshold Level" field of the Output Port Threshold Register and the "Grant Counter Threshold Level" field of the Output Port Grant Threshold Register. Both functions support an optional hysteresis setting. Writing a value to the hysteresis setting determines the number of packets or grants below the associated threshold setting at which the status signal is asserted when the FIFO or counter is draining. When using the hysteresis option, the threshold level field determines the FIFO or grant counter level at which the status signal is negated when the FIFO or counter is filling.

The PKT IP Status signal protects the input FIFOs when a temporary congestion occurs. For example, a condition that causes an input FIFO to experience congestion occurs when a large number of inputs are destined to an output and the input GigaPoint links have differing unicast packet rates. The differing input rates lead to a distortion in time of the serialized grants to that output such that multiple packets arrive simultaneously at a number of input FIFOs. If one of the inputs is operating at a much higher packet rate than the other inputs, and that fast input was just granted by the Arbiter for that output, then packets will accumulate in that inputs FIFO until the Arbiter gets back around the round robin to transfer the packets from the fast input to the output. If this case occurs, then the IP FIFO threshold is crossed which in turn causes the PKT IP Status signal to be asserted causing the GigaPoint Arbiter to stop granting packets destined to the input FIFO. In addition, if the backpressure threshold is crossed, a backpressure signal is asserted to the associated Tx MAC causing it to transport a backpressure bit to the associated GAP stopping packet flow into the input FIFO. The level at which the IP FIFO status signal is asserted or negated when filling or draining respectively is programmable in increments of one packet by writing to the "Input FIFO Threshold Level" field of the Input Port Threshold Register. The level at which the Backpressure status signal is asserted or negated when filling or draining respectively is programmable in increments of one packet by writing to the "Backpressure Threshold Level" field of the Input Port Backpressure Level Register. The backpressure level must be programmed so that input FIFOs have enough entries past the threshold to hold the number of packets that continue to arrive due to the latencies associated with asserting backpressure and actually halting the packets. If an overflow of an input FIFO should occur, the error condition is latched and an interrupt is asserted if enabled.

While in one embodiment, a network element of the type described herein does not provide call processing functions, in another embodiment call processing may be supported by a network element of the type described herein.

Many embodiments of the invention relate to a network element for a communication network, wherein the network element includes a first line unit comprising circuitry to support subscriber equipment, a second line unit comprising circuitry to support a link to core of the communication network, and a chassis, with each of the first line unit and the second line unit being installed said chassis. In some embodiments, the network element further includes a switch unit having a first port coupled to the first line unit and a second port coupled to the second line unit, the switch unit being installed in said chassis. In several embodiments of the network element, the first line unit carries traffic from and to the subscriber equipment, and the second line unit carries said traffic sequentially thereby to pass said traffic to and from said core of the communication network. Also, in some embodiments, the network element further includes a switch unit having a first port coupled to the first line unit and a second port coupled to the second line unit, the switch unit being installed in said chassis, the switch unit comprising a cross-connect. In several such embodiments, the cross-connect includes asynchronous cross-connect and an asynchronous cross-connect. In one such embodiment of the network element, at one time the synchronous cross-connect transfers traffic between the first line unit and the second line unit, and at another time the asynchronous cross-connect transfers traffic between the first line unit and the second line unit.

Numerous such modifications and adaptations are encompassed by the attached claims.

What is claimed is:

1. A network element for a communication network, the network element comprising:

a chassis comprising a plurality of slots identical to one another;

a switch unit directly connected to each slot in the chassis by at least one serial bus in a plurality of serial buses, each serial bus being of identical format and identical bandwidth to another serial bus, the switch unit comprising a synchronous cross-connect and an asynchronous cross-connect, each cross-connect being coupled to each serial bus, and the switch unit further comprises a plurality of serializer/deserializers and a plurality of media access controllers, each serializer/deserializer being connected on one side to a serial bus in the plurality of serial buses, and each serializer/deserializer being further connected on another side to a media access controller; and each media access controller is connected to the synchronous cross-connect and each media access controller is further connected to the asynchronous cross-connect, wherein each media access controller accepts combined asynchronous and synchronous traffic from a single serial bus and distributes the asynchronous traffic to the asynchronous cross-connect and distributes the synchronous traffic to the synchronous cross-connect; and the synchronous cross-connect and the asynchronous cross-connect process traffic provided by the media access controller in a time shared manner, such that:

at one time the asynchronous cross-connect transfers synchronous traffic between serial buses; and at another time the asynchronous cross-connect transfers asynchronous traffic between said serial buses;

wherein the combined synchronous and asynchronous traffic is carried on the single serial bus in a superframe of a predetermined duration, the superframe comprises at least one frame of predetermined duration, the frame comprises a plurality of channels, each channel carries either synchronous traffic or asynchronous traffic;

wherein within a channel carrying synchronous traffic, frame position of a SONET payload envelope (SPE) is determined by offset value of payload pointers H1, H2 and H3; and wherein within a channel carrying asynchronous traffic, a plurality of fixed length cells are each aligned to a boundary of the superframe, and each cell comprises a routing map field indicative of an output port of the asynchronous cross-connect to which the cell is to be routed.

2. The network element of claim 1 wherein:

the switch unit is implemented in an ASIC located on an optical line card installed in a central region of the chassis; and the ASIC comprises at least the synchronous cross-connect and the asynchronous cross-connect.

3. A network element for a communication network, the network element comprising:

a chassis comprising a plurality of slots identical to one another;

a switch unit directly connected to each slot in the chassis by a serial bus, said switch unit comprising a synchronous cross-connect and an asynchronous cross-connect, each serial bus being coupled to the synchronous cross-connect and each serial bus being further coupled to the asynchronous cross-connect, each slot being coupled to another slot only through said switch unit;

wherein the synchronous cross-connect and the asynchronous cross-connect operate simultaneously to transfer traffic to and from the serial buses, and use of each serial bus is time shared between the cross-connects such that:

at one time the synchronous cross-connect transfers traffic between a set of serial buses; and at another time the asynchronous cross-connect transfers traffic between said set of serial buses; and wherein the synchronous cross-connects transfers traffic between serial buses in said set during a plurality time slots relative to a superframe sync, in accordance with bandwidth allocation as per a channel map configuration;

wherein the asynchronous cross-connect transfers traffic between serial buses in said set at a time other than said time slots, based on arrival and backpressure signals, and said arrival and backpressure signals are time multiplexed onto said serial buses which carry the traffic to the synchronous and asynchronous cross-connects; and wherein the arrival signal indicates to the asynchronous cross-connect arrival of a cell at a virtual output queue of an upstream line unit that sends the arrival signal; and wherein the backpressure signal indicates to the asynchronous cross-connect a full or near full queue condition at a downstream line unit that sends the backpressure signal.

4. The network element of claim 3 wherein:

the switch unit is implemented in an ASIC located in an optical line card, the optical line card being installed in a central region of the chassis.

5. The network element of claim 3 further comprising:

an inactive unit also directly connected to each slot in the chassis by another serial bus.

6. The network element for a communication network, the network element comprising:

means for housing a plurality of line cards, said means for housing having a plurality of slots identical to one another;

means for switching installed in a central region of the means for housing, said means for switching being directly connected to each slot by a full-duplex serial bus, said means for switching comprising means for switching synchronous traffic and means for switching asynchronous traffic, each full-duplex serial bus being coupled to the means for switching synchronous traffic and each full-duplex serial bus being further coupled to the means for switching asynchronous traffic, each slot in the plurality of slots being coupled to another slot in the plurality of slots only through said means for switching;

wherein the means for switching synchronous traffic and means for switching asynchronous traffic operate simultaneously to transfer traffic to and from the full-duplex serial buses, and use of each full-duplex serial bus is time shared between the means for switching synchronous traffic and means for switching asynchronous traffic such that:

at one time the means for switching synchronous traffic transfers traffic between a pair of full-duplex serial buses; and at another time the means for switching asynchronous traffic transfers traffic between said pair of full-duplex serial buses;

wherein the combined synchronous and asynchronous traffic is carried on the single serial bus in a superframe of a predetermined duration, the superframe comprises at least one frame of predetermined duration, the frame comprises a plurality of channels, each channel carries either synchronous traffic or asynchronous traffic;

wherein within a channel carrying synchronous traffic, frame position of a SONET payload envelope (SPE) is determined by offset value of payload pointers H1, H2 and H3; and wherein within a channel carrying asynchronous traffic, a plurality of fixed length cells are each aligned to a boundary of the superframe, and each cell comprises a routing map field indicative of an output port of the asynchronous cross-connect to which the cell is to be routed.

7. The network element of claim 6 wherein:

the means for switching synchronous traffic transfers traffic between the pair of serial buses using a plurality time slots relative to a superframe sync, in accordance with bandwidth allocation as per a channel map configuration;

The means for switching synchronous traffic transfers traffic between serial buses in said pair at a time other than said time slots, based on arrival and backpressure signals, and said arrival and backpressure signals are time multiplexed onto said pair of serial buses.

* * * * *

UNITED STATES PATENT AND TRADEMARK OFFICE
CERTIFICATE OF CORRECTION

PATENT NO. : 6,798,784 B2 Page 1 of 1
DATED : September 28, 2004
INVENTOR(S) : Dove et al.

It is certified that error appears in the above-identified patent and that said Letters Patent is hereby corrected as shown below:

Title page,
Item [73], Assignee, "Caux Networks, Inc." should be -- Calix Networks, Inc. --.

Column 16,
Line 33, "VO4Q" should be -- VOQ4 --.
Line 36, "WOQ5" should be -- VOQ5 --.

Column 17,
Line 1, insert -- TYPE Grant type bits. The Type bits transport grant state as described below: --.

Column 32,
Line 37, "asynchronous" should read -- synchronous --.

Column 33,
Line 44, insert between "inactive" and "unit", -- switch --.
Line 46, "The network element" should be -- A network element --.

Column 34,
Line 47, "The means for switching" should be -- the means for switching --.

Signed and Sealed this

Twenty-first Day of February, 2006

JON W. DUDAS
*Director of the United States Patent and Trademark Office*